(12) United States Patent
Heinz et al.

(10) Patent No.: US 10,015,056 B2
(45) Date of Patent: *Jul. 3, 2018

(54) SYSTEM, METHOD AND APPARATUS FOR IMPROVING THE PERFORMANCE OF COLLECTIVE OPERATIONS IN HIGH PERFORMANCE COMPUTING

(71) Applicant: Intel Corporation, Santa Clara, CA (US)

(72) Inventors: Michael Heinz, Phoenixville, PA (US); Todd Rimmer, Exton, PA (US); James Kunz, Plymouth, MN (US); Mark Debbage, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/207,706

(22) Filed: Jul. 12, 2016

(65) Prior Publication Data

US 2016/0323150 A1  Nov. 3, 2016

Related U.S. Application Data

(63) Continuation of application No. 14/495,190, filed on Sep. 24, 2014, now Pat. No. 9,391,845.

(51) Int. Cl.
*H04L 12/28* (2006.01)
*H04L 12/24* (2006.01)
(Continued)

(52) U.S. Cl.
CPC ............ *H04L 41/12* (2013.01); *G06F 9/5066* (2013.01); *H04L 41/0213* (2013.01);
(Continued)

(58) Field of Classification Search
CPC combination set(s) only.
See application file for complete search history.

(56) References Cited

U.S. PATENT DOCUMENTS 5,355,371 A  10/1994  Auerbach et al.
5,394,556 A  2/1995  Oprescu
(Continued)

FOREIGN PATENT DOCUMENTS

WO  2016/048476 A1  3/2016

OTHER PUBLICATIONS

International Search Report and Written opinion for PCT Patent Application No. PCT/US2015/045176, dated Dec. 1, 2015, 14 pages.

(Continued)

*Primary Examiner* — Frank Duong
(74) *Attorney, Agent, or Firm* — Law Office of R. Alan Burnett, P.S

(57) ABSTRACT

System, method, and apparatus for improving the performance of collective operations in High Performance Computing (HPC). Compute nodes in a networked HPC environment form collective groups to perform collective operations. A spanning tree is formed including the compute nodes and switches and links used to interconnect the compute nodes, wherein the spanning tree is configured such that there is only a single route between any pair of nodes in the tree. The compute nodes implement processes for performing the collective operations, which includes exchanging messages between processes executing on other compute nodes, wherein the messages contain indicia identifying collective operations they belong to. Each switch is configured to implement message forwarding operations for its portion of the spanning tree. Each of the nodes in the spanning tree implements a ratcheted cyclical state machine that is used for synchronizing collective operations, along with status messages that are exchanged between nodes. Transaction IDs are also used to detect out-of-order and lost messages.

18 Claims, 15 Drawing Sheets

(51) Int. Cl.
  *H04L 12/753* (2013.01)
  *H04L 12/751* (2013.01)
  *G06F 9/50* (2006.01)

(52) U.S. Cl.
  CPC .......... *H04L 41/0893* (2013.01); *H04L 45/08* (2013.01); *H04L 45/48* (2013.01); *H04L 41/046* (2013.01)

(56) References Cited

U.S. PATENT DOCUMENTS

| | | |
|---|---|---|
| 5,925,097 A | 7/1999 | Gopinath et al. |
| 6,081,512 A | 6/2000 | Muller et al. |
| 6,865,178 B1 | 3/2005 | Euget et al. |
| 8,660,007 B2 | 2/2014 | Tanaka et al. |
| 2005/0097300 A1 | 5/2005 | Gildea et al. |
| 2009/0003344 A1 | 1/2009 | Kumar |
| 2011/0113083 A1 | 5/2011 | Shahar |
| 2011/0219208 A1* | 9/2011 | Asaad ..................... G06F 15/76 712/12 |
| 2012/0030370 A1 | 2/2012 | Faraj et al. |
| 2013/0145378 A1 | 6/2013 | Faraj et al. |

OTHER PUBLICATIONS

International Preliminary Report on Patentability and Written Opinion Received for PCT Patent Application No. PCT/US2015/045176, dated Apr. 6, 2017, 11 pages.

* cited by examiner

4 State Ratchet

Stage 1

Stage 2

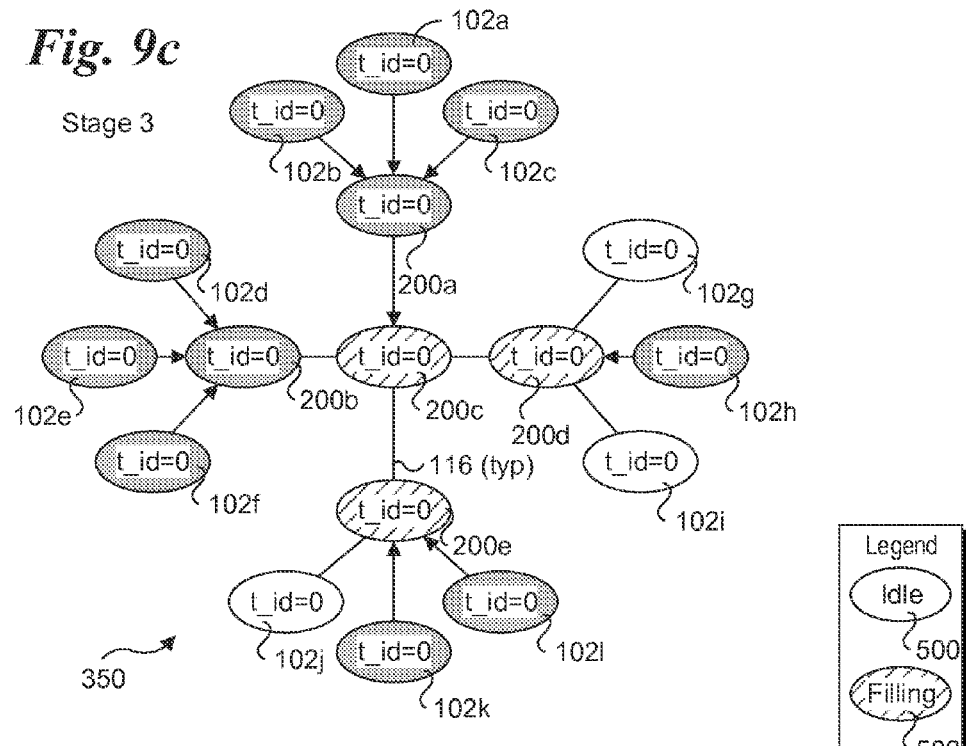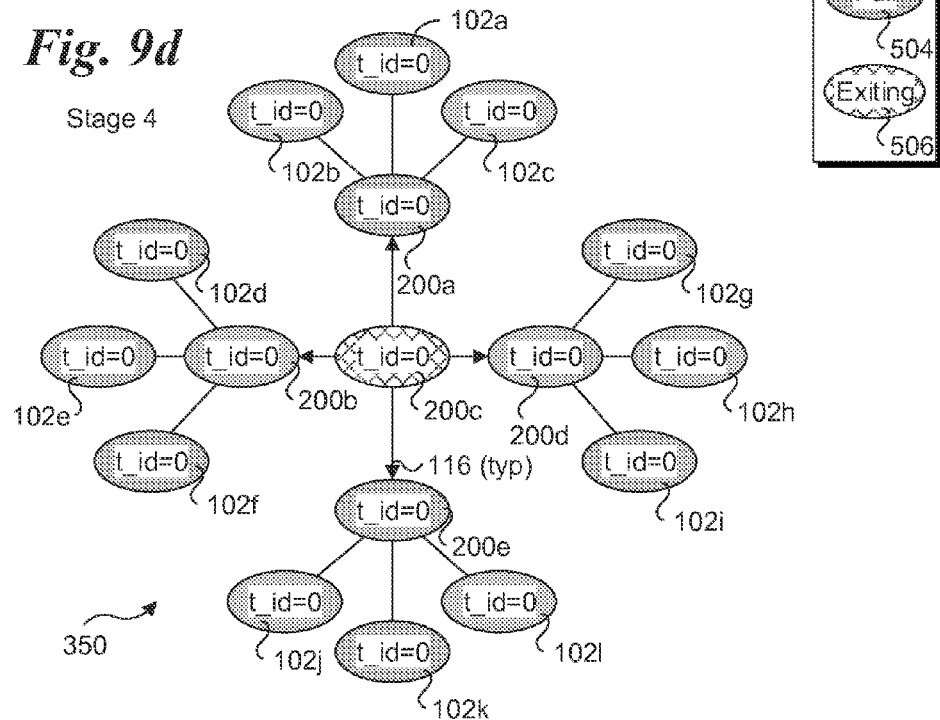

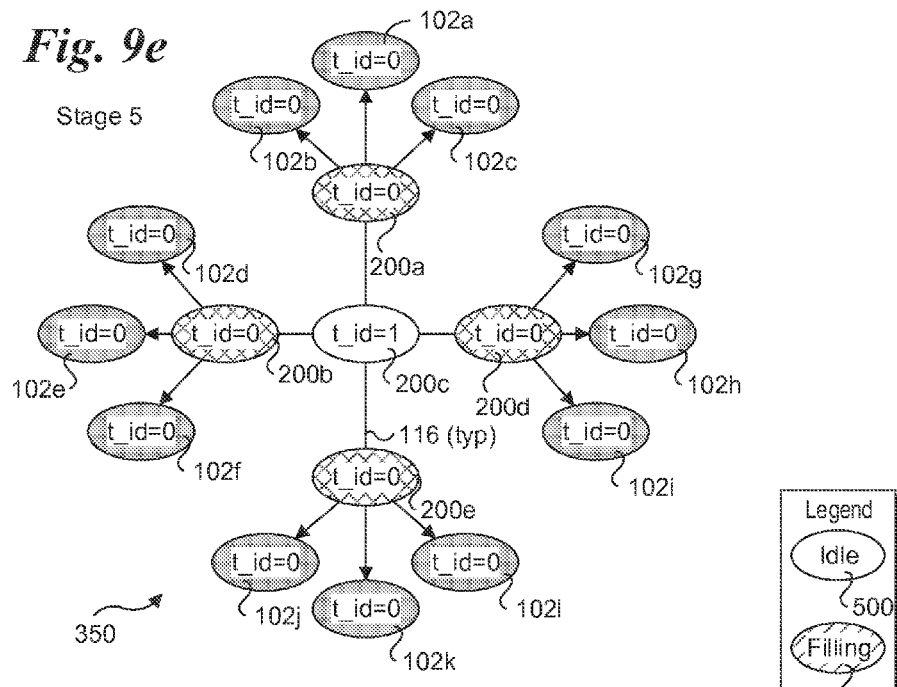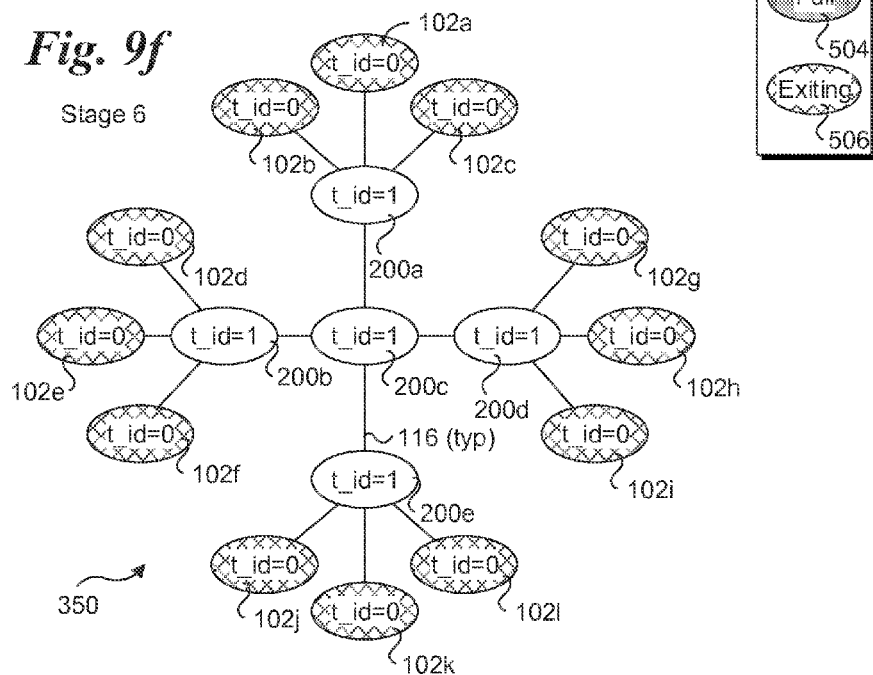

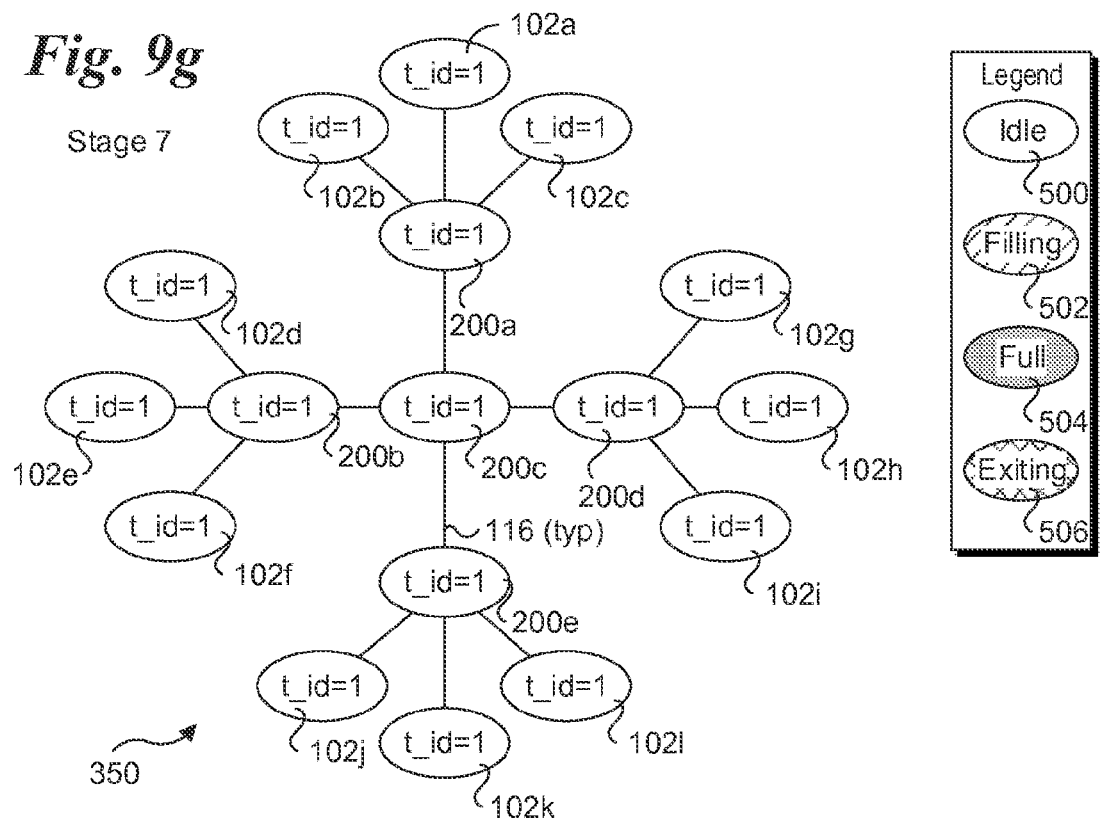

Stage 8

Stage 9

Stage 10

SYSTEM, METHOD AND APPARATUS FOR IMPROVING THE PERFORMANCE OF COLLECTIVE OPERATIONS IN HIGH PERFORMANCE COMPUTING

RELATED APPLICATIONS

The present application is a continuation of U.S. patent application Ser. No. 14/495,190 filed on Sep. 24, 2014, entitled "SYSTEM, METHOD AND APPARATUS FOR IMPROVING THE PERFORMANCE OF COLLECTIVE OPERATIONS IN HIGH PERFORMANCE COMPUTING", which is hereby incorporated herein by reference in its entirety and for all purposes.

BACKGROUND INFORMATION

High-performance computing (HPC) has seen a substantial increase in usage and interests in recent years. Historically, HPC was generally associated with so-called "Super computers." Supercomputers were introduced in the 1960s, made initially and, for decades, primarily by Seymour Cray at Control Data Corporation (CDC), Cray Research and subsequent companies bearing Cray's name or monogram. While the supercomputers of the 1970s used only a few processors, in the 1990s machines with thousands of processors began to appear, and more recently massively parallel supercomputers with hundreds of thousands of "off-the-shelf" processors have been implemented.

In an HPC environment, large numbers of computing systems (e.g., blade servers or server modules) are configured to work in parallel to solve complex tasks. Each server may include one or more processors with associated resources (e.g., local memory for each processor), wherein each processor is operated as a compute "node." The servers typically operate within a collective group called a cluster to perform a collective operation. For more complex tasks, clusters of servers may be configured in an HPC cluster hierarchy or the like, with each cluster dedicated to performing a subtask of the overall complex task.

Various types of network topologies and protocols may be used to interconnect nodes in an HPC environment, with the most commonly used interconnects employing InfiniBand or Ethernet. In a typical HPC use of InfiniBand, the compute nodes run processes that use an Application Programming Interface (API) to exchange data and results with other processes running on other nodes. Examples of these APIs include Message Passing Interface (MPI), Symmetric Hierarchical Memory Access (SHMEM), and Unified Parallel C (UPC). In particular, these processes use a class of operations called "Collectives," which are used to enable communication and synchronization between multiple processes on multiple nodes.

These Collective operations require communication between multiple computers in the HPC cluster. As the number of processes involved in the operations grows, the number of additional messages needed to handle possible errors and to synchronize the processes also grows. In addition, the Collective operations are unaware of the physical topology of the interconnect network. These two factors create inefficiencies that degrade the performance of the HPC cluster, causing computations to take longer to complete.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIGS. 9a, 9b, 9c, 9d, 9e, 9f, and 9g illustrate the state machine states and transaction ID states of nodes in the spanning tree of FIG. 3b as a Barrier operation is being entered and completed;

DETAILED DESCRIPTION

Figure 1:
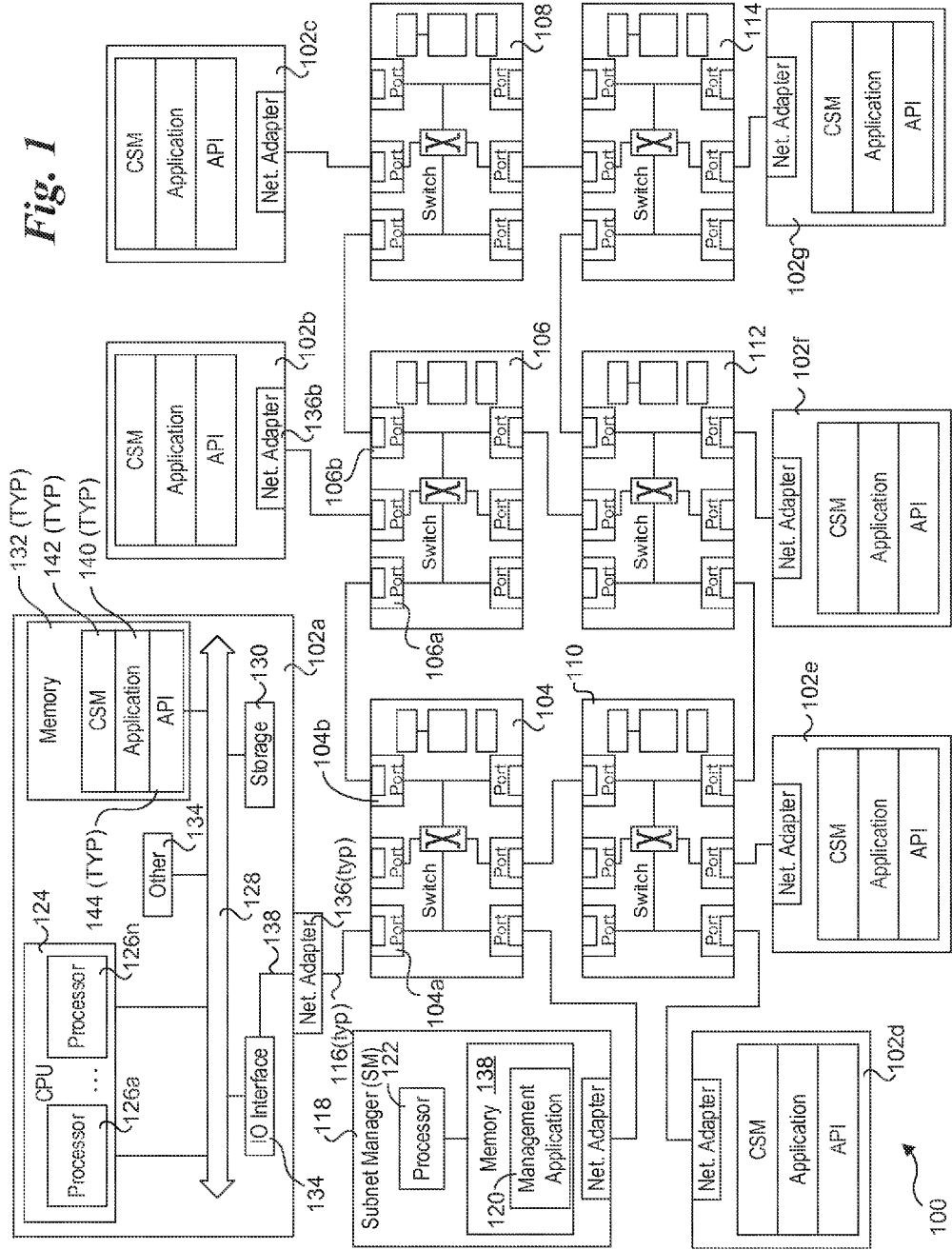
FIG. 1 is a block diagram illustrating an exemplary system for implementing aspects of various embodiments disclosed herein.

Embodiments of systems, methods, and apparatus for improving the performance of collective operations in High Performance Computing are described herein. In the following description, numerous specific details are set forth to provide a thorough understanding of embodiments disclosed and illustrated herein. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

FIG. 1 is a block diagram illustrating an exemplary system 100 for implementing aspects of various embodiments disclosed herein. In one embodiment, system 100 includes a plurality of computing system 102a-102g (which may also be referred to herein as computing system 102, compute node or simply node) linked in communication with one another via a plurality of switches 104, 106, 108, 110, 112, and 114 and network links 116. System 100 includes a subnet manager (SM) 118 executing a management application 120 on a processor 122, described below in further detail. There may be other systems/components that may be placed between the aforementioned components but they are not germane to the embodiments disclosed herein. It is noteworthy that the embodiments disclosed herein are not limited to any particular number of computers or switches, but rather the numbers shown are merely for illustrative purposes.

Details of one embodiment of a computing system 102 are shown for computing system 102a. Each computing system 102 include a central processing unit 124 that may include one or more processors 126a-126n connected to other components in the computing system via one or more interconnects, depicted as an interconnect 128 for simplicity. Alternatively, processors 126a-126n may represent cores in a multi-core processor, or processors 126a-126n may comprise separate CPUs in a multi-socketed computer system. Generally, CPU 124 may comprise one or more programmable general-purpose or special-purpose microprocessors, digital signal processors (DSPs), programmable controllers, application specific integrated circuits (ASICs), programmable logic devices (PLDs), or the like, or a combination of such hardware devices.

Interconnect 128 may comprise one or more of a system bus, a Peripheral Component Interconnect (PCI) bus or PCI Express (PCIe) interconnect, a HyperTransport or industry standard architecture (ISA) bus, a SCSI bus, a universal serial bus (USB), an Institute of Electrical and Electronics Engineers (IEEE) standard 1394 bus (sometimes referred to as "Firewire"), or any other type of interconnect system. Additionally, Interconnect 128 may comprise an interconnect fabric, such as an INTEL® QuickPath Interconnect™ fabric, an INTEL® On-Chip Scalable Fabric (IOSF), as well as other fabric-based interfaces including the Open Core Protocol (OCP), and ARM's AMBA (Advanced Microcontroller Bus Architecture) interface.

Computing system 102 may also include a storage device 130, which may comprise a hard disk (magnetic, optical, or Solid State Drive (SSD)), a CD-ROM or DVD drive, a non-volatile memory device (flash or memory stick) or any other type of storage device. Storage device 130 may store processor executable instructions and data, for example, operating system modules and components, application modules and data files, and other files. In one embodiment, some of these files are stored at storage device 130 using an installation program or the like.

Computing system 102 also includes a memory 132, which is generally representative of one or more types of memory, such as random access memory (RAM), and/or read only memory (ROM). Generally, when executing stored computer-executable instructions from storage device 130, CPU 124 may load the instructions into memory 132 and retrieve the instructions from memory for execution. Optionally, all or a portion of the instructions may be downloaded from a network and loaded into memory 132.

Computing system 102 may also include other devices and interfaces 133, which may include a display device interface, a keyboard interface, a pointing device interface and others. In some embodiments, computer system 102 is a blade server or server module or the like, which doesn't directly interface with a keyboard, pointing device, or similar user interface, and may not include a display device interface.

Computing system 102 also includes an IO (Input-Output) interface 134 that is coupled to a network adapter 136 via a link 138. For example, IO interface 134 may comprise a peripheral bus interface comprising one or more of a PCI, PCI-X or PCIe interface that is connected to network adapter 136 via a PCI, PCI-X or PCIe interconnect. Optionally, any other type of IO interface and associated interconnect may be used. Generally, network adapter 136 may be configured to handle network and/or storage traffic using various network and storage protocols. Some common protocols are described below.

InfiniBand ("IB") is an industry standard typically used with computing systems and input/output (I/O) devices. The IB standard is used to create fabrics, which may encompass numerous (for example thousands) of interconnected hosts/switches/servers, all working in parallel to solve complex problems. A typical IB network includes a plurality of switches linked to each other or to one or more computing systems. An IB network is often used in a high performance computing environment environments.

Another common network protocol is Ethernet. Various Ethernet standards are defined by IEEE under 802.3-related specifications. The original Ethernet bus or star topology was developed for local area networks (LAN) to transfer data at 10 Mbps (Mega bits per second). More recently, Ethernet standards have been developed by various IEEE 802.3 working groups for 10 Gbps (Gigabits per second, also referred to as 10 Gigabit Ethernet or 10G Ethernet), 40 Gbps (40G Ethernet), and 100 Gbps (100G Ethernet). Ethernet links operating at speeds of 10 Gbps and above are sometimes referred to as high-speed Ethernet links, and such links are commonly deployed in HPC architectures.

A common storage network protocol used to access storage systems is Fibre Channel. Fibre channel is a set of American National Standards Institute (ANSI) standards that provide a serial transmission protocol for storage and network protocols such as HIPPI, SCSI, IP, ATM and others. Fibre channel supports three different topologies: point-to-point, arbitrated loop and fabric. The point-to-point topology attaches two devices directly. The arbitrated loop topology attaches devices in a loop. The fabric topology attaches host systems directly (via HBAs) to a fabric, which are then connected to multiple devices. The Fibre Channel fabric topology allows several media types to be interconnected. Fibre Channel fabric devices include a node port or "N_Port" that manages Fabric connections. The N_port establishes a connection to a Fabric element (e.g., a switch) having a fabric port or F_port.

A recently introduced standard, called Fibre Channel over Ethernet (FCoE) has been developed to handle both Ethernet and Fibre Channel traffic in a storage area network (SAN). This functionality allows Fibre Channel to leverage 10 Gigabit Ethernet networks at the physical layer, while preserving the Fibre Channel protocol.

It is noteworthy that the present embodiments are not limited to any particular protocol. Rather, the principles and techniques disclosed in the embodiments herein may be implemented using various protocols, including both existing standardized protocols, future standardized protocols, and existing and future proprietary protocols.

As described above, switches 104, 106, 108, 110, 112, and 114 enable communication between various components of system 100 including computing systems 102a-102g and subnet manager 118. As an example, a port 104a of switch 104 is coupled to network adapter 136, while a port 104b is coupled to port 106a of switch 106. Another port 106b of switch 106 is coupled to a network adapter 136b of computer system 102b. In addition, various other ports on switches 104, 106, 108, 110, 112, and 114 are used to interconnect the various system 100 components in communication via network links 116.

The various interconnect links describe above and shown in FIG. 1 are an example of a network system having a plurality of switches. The embodiments disclosed herein are not limited to any particular number of switches, ports, adapters or other network devices.

The various switch ports illustrated for switches 104, 106, 108, 110, 112, and 114, may include logic and circuitry for facilitating receipt and forwarding of traffic using one or more network protocols. In one embodiment, the various ports are configured to process information complying with the IB standard. In other embodiments, the ports are configured to facilitate transfer of packetized traffic using an Ethernet protocol. In still other embodiments, a proprietary non-standard protocol may be supported. In addition, in some embodiments one or more of switches 104, 106, 108, 110, 112, and 114 may be configured to support a network gateway function, enabling traffic received using a given protocol to be forwarded out of a switch port using a different protocol.

In one embodiment, subnet manager 118 may be a computing system similar to computing systems 102a-102g described above. For example, subnet manager 118 includes one or more processors 122 that has access to a memory 138 and one or more storage devices (not shown). Processor 122 executes management application 120 to enable subnet manager 118 to configure various components of system 100, such as switches 104, 106, 108, 110, 112, and 114.

In one embodiment, management application 120 includes or is a subnet manager (SM) provided by the IB standard. The IB standard also specifies a Subnet Management Agent (SMA) that implements a SMA protocol, which is used by management application 120 to communicate with computing systems 102a-102g and various switches used in system 100. For convenience and simplicity, SM and SMA may be used herein to generally apply to components configured to support similar subnet manager and Subnet Management Agent functionality that may be implemented for other networking protocols in addition to IB.

Computing systems 102a-102g may concurrently execute one or more applications 140. Examples of applications that are represented by applications 140 include storage applications (for example, Network File System (NFS), Lustre File System provided by Sun Microsystems Inc.; or General Parallel File System ("GPFS") provided by IBM Corporation), network applications (for example, Secure Shell (SSH) applications, TELNET (a network protocol used the Internet and Local Area Networks) applications and/or Web servers), computing applications (for example, MPI (Message Passing Interface) applications such as LS-Dyna, an advanced general-purpose multiphysics simulation software package developed by the Livermore Software Technology Corporation (LSTC); or Fluent (a computational fluid dynamics software, developed by Fluent Inc.) and others.

MPI is often used in a HPC environment by computing systems to exchange data and results. Computing processes use a class of operations, called "Collectives" to enable communication between various processes executed by a plurality of computing systems. As the number of processes increase in a HPC environment, the number of messages to handle error conditions also increases.

As discussed above, conventional collective operations have challenges as the number of processes continues to increase. For example, collective operations in conventional systems are unaware of the network topology and messages are passed around like any other standard network message. Under the embodiments described herein, messages for facilitating collective operations are implemented in a more intelligent and efficient manner. This is facilitated, in part, by collective state machine (CSM) logic 142 and application program interface (API) 144, which are provided for coordinating and routing operations within a collective group, as described below in further detail.

Figure 2:
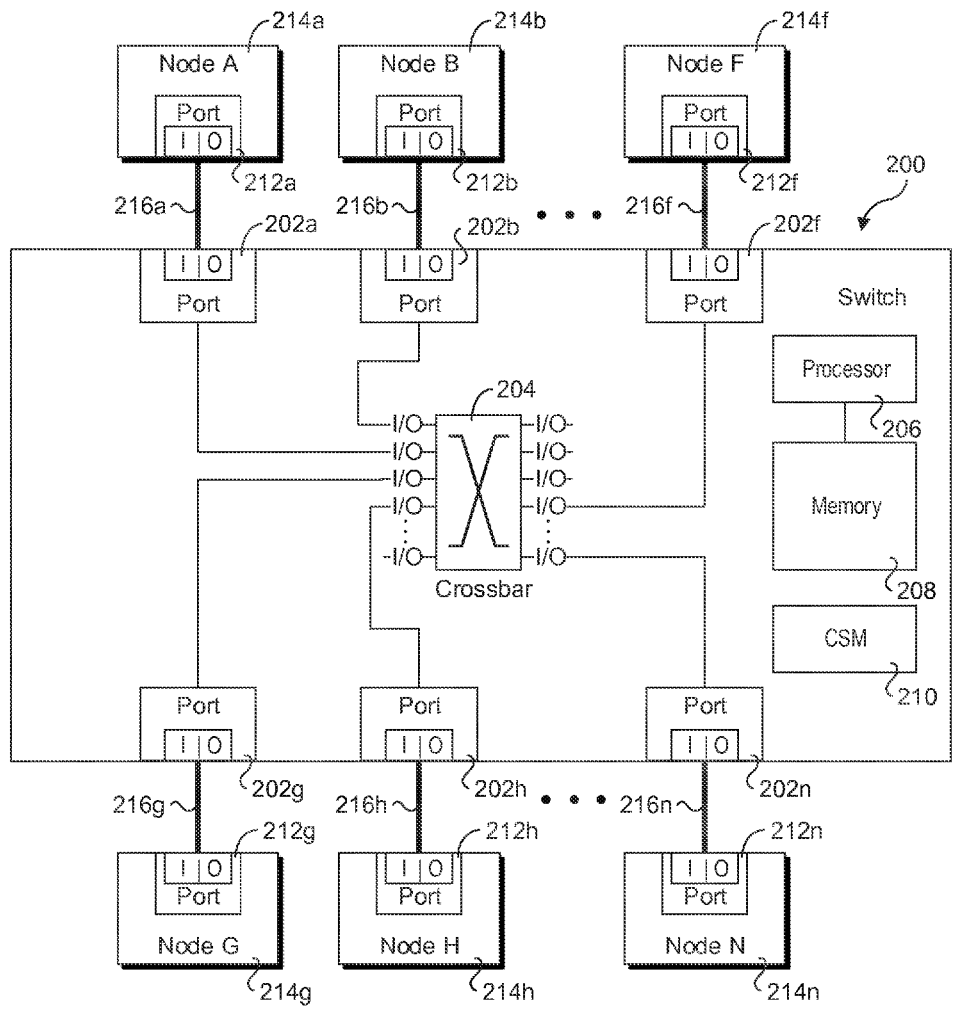
FIG. 2 is a block diagram of a switch that may be used for one or more of switches shown in the system of FIG. 1.

FIG. 2 shows a block diagram of a switch 200 that may be used for one or more of switches 104, 106, 108, 110, 112, and 114 of FIG. 1. Switch 200 includes n ports 202a-202n, which are generally referred to herein as a port 202. Each port 202 includes in input port 'I' and an output port 'O'. Ports 202a-202n are each connected to a crossbar 204, which is used to depict interconnect circuitry within switch 200 to enable data to be forwarded between input and output ports of switches 202a-202n. It is noted that in addition to the interconnect circuitry, various buffers and other logic (both not shown) are implemented within switch 200 to facilitate various aspects of network switch operations, as will be recognized by those skilled in the networking arts. These operations are further facilitated through the use of a processor 206, memory 208, and CSM logic 210. Generally processor 206 is illustrative of various types of processors, including single core and multi-core general purpose or special-purpose processors, as well as embedded processors. While memory 208 is shown as a single block, it may be distributed. In addition, memory address ranges in memory 208 comprise one or more memory-mapped IO (MMIO) address spaces used by switch 200.

As further shown in FIG. 2, each of ports 202a-202n is connected to a respective port 212a-212n on a respective node 214a-214n via a respective link 216a-216n. Each of these nodes is representative of another component in system 100, such as another switch, computer system, or subnet manager.

Figure 3:
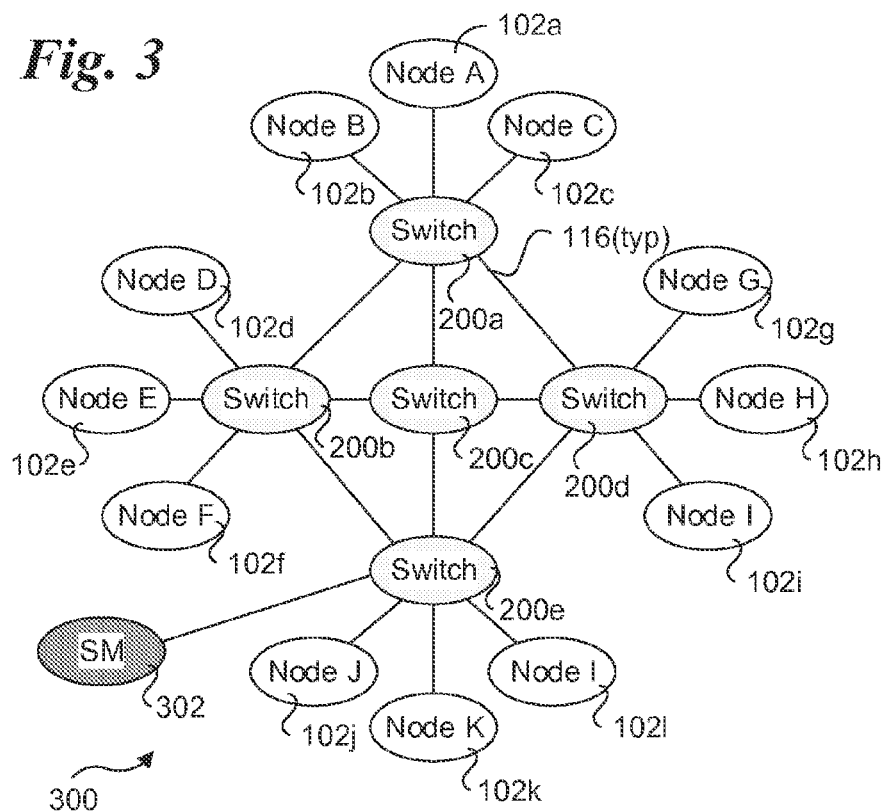
FIG. 3 is a block diagram of a subnet of an HPC network environment comprising multiple compute nodes interconnected via switches and links.

FIG. 3 depicts a system 300 comprising a 12 compute nodes 102a-102l (also labeled Node A-Node L) and an SM 302 interconnected via five switches 200a-200e and network links 216 forming a network mesh commonly referred to as a "fabric." Generally, traffic (e.g., MPI messages) may be sent from any of the compute nodes to any other compute node via one or more routed paths (routes). For example, Node A may send traffic to any of Nodes J, K or L via three different paths, each traversing three switches (e.g., via switches 200a, 200c and 200e). Meanwhile, there is only one route between pairs of nodes for Nodes A, B, and C (all via switch 200a). Also note there are several loops formed by switches 200a-200e and links 302 connecting these switches to one another.

Figure 4:
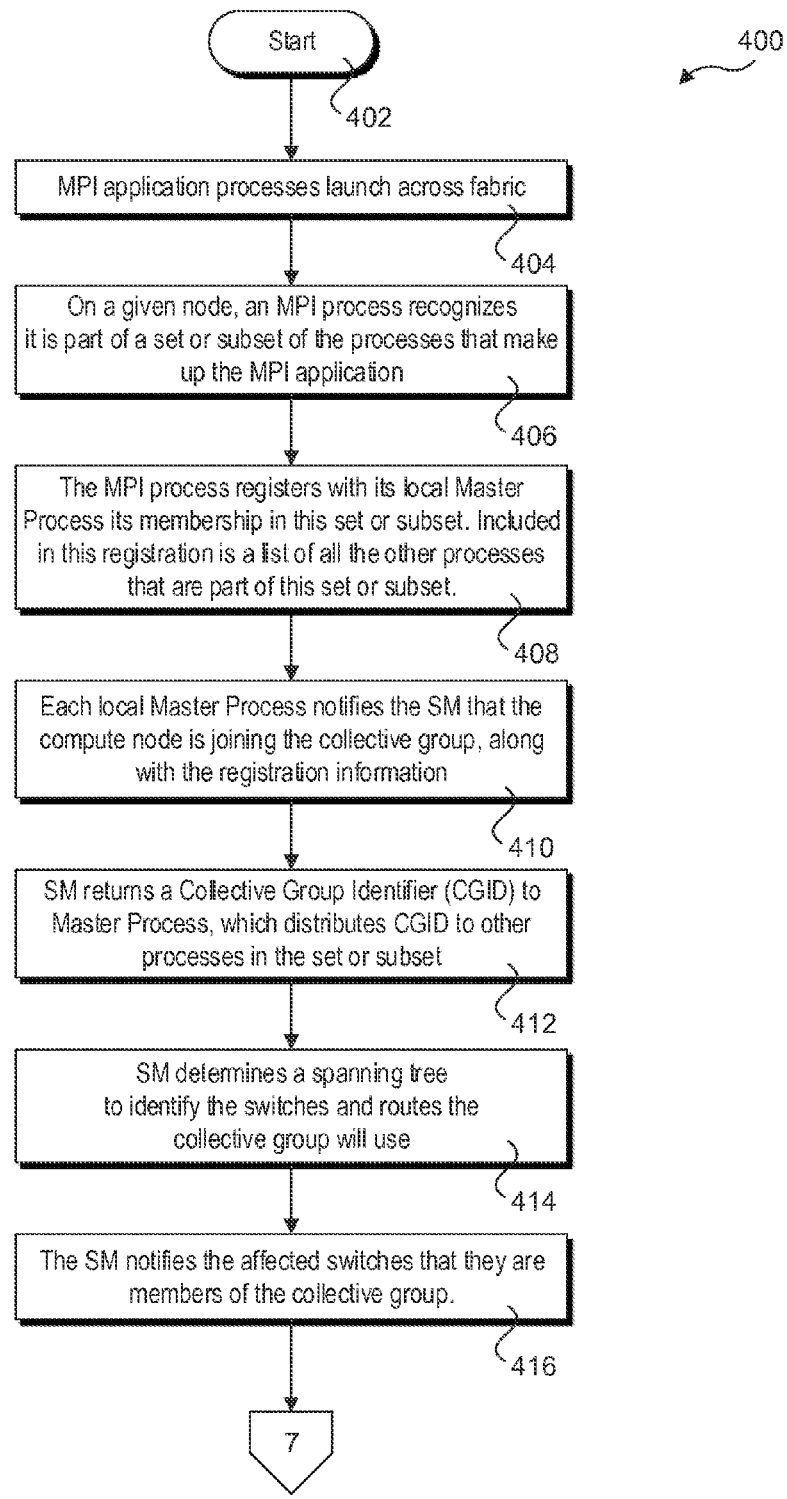
FIG. 4 is a flowchart illustrating operations for setting up a collective operation, according to one embodiment.

FIG. 4 shows a flowchart 400 illustrating operations for setting up a collective group, according to one embodiment. Following the start of the process depicted by a start block 402, the process proceeds to a block 404 in which the MPI application processes launch on nodes across the fabric. In a block 406, an MPI process on a given nodes recognizes it is part of a set or subset of the processes that make up the MPI application on that node. In a block 408, the MPI process registers with its local Master Process its membership in this set or subset. Included in this registration is a list of all of the other processes that are part of the set or subset.

Figure 3A:
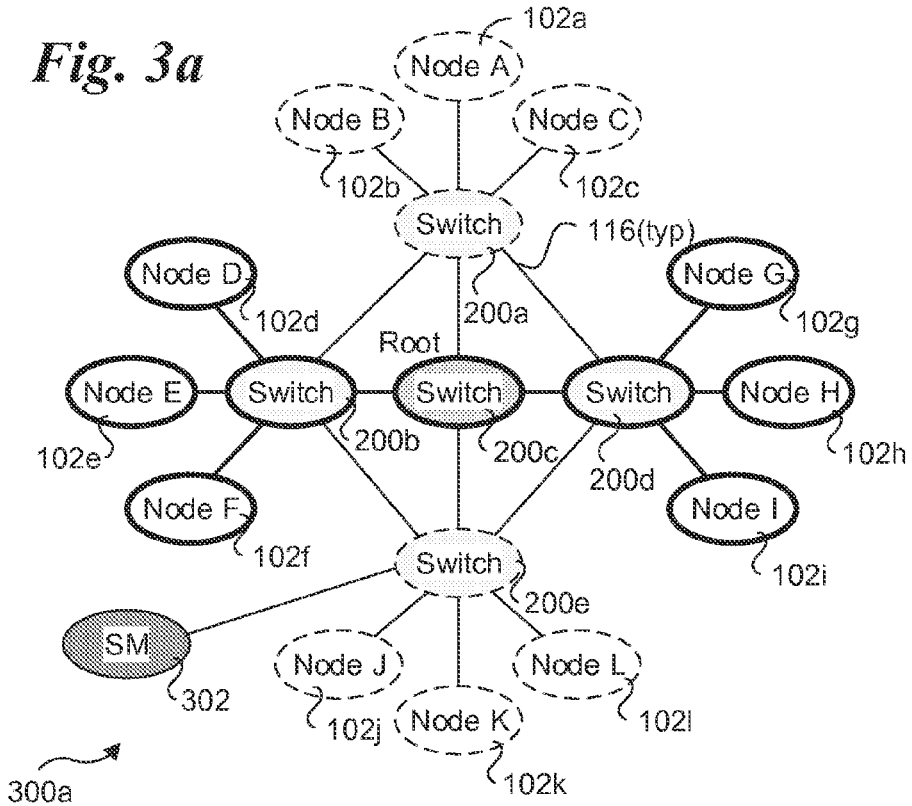
FIG. 3a shows a first spanning tree formed from nodes in the subnet of FIG. 3, including compute Nodes D, E, F, G, H, and I and three switches.

Next, in a block 410, each local Master Process notifies the SM (e.g., SM 302) that the compute node (hosting that Master Process) is joining the collective group, along with sending the registration information corresponding to the set or subset of MPI application processes executing on the compute node. As shown in FIG. 3a, in a first example the compute nodes that will be participating in the collective group are Nodes D, E, F, G, H, and I. In response to registration, SM 302 returns a Collective Group identified (CGID) to the Master Process, which distributes the CGID to the other processes in the set or subset of processes executing on that compute node.

Next, in a block 414, SM 302 determines a spanning tree including the compute nodes that have joined the collective group, switch nodes (switches) used to interconnect the compute nodes, and routes the collective group will use. In some instances, the spanning tree is built as a new tree, which will involve determining the network topology for at least the portion of the network including the compute nodes that have joined the collective group. Techniques for determining network topology are well known, and include next neighbor propagation (each node and switch exchanges link and port configuration information with its neighbor and then propagates that to other neighbors), link path tracing, and use of a centralized link management approach where each node and switch forwards its port configuration information, enabling a central management entity to determine the network topology. In one embodiment, each switch sends its local port configuration information to SM 302. In addition to building a spanning tree from scratch, an existing spanning tree may be expanded when registration information is received from a new compute node that isn't already in the existing spanning tree.

The spanning tree is derived from principles used by the Spanning Tree Protocol (STP). STP is a network protocol that ensures a loop-free topology for any bridged Ethernet Local Area Network (LAN). Under its original conventional usage, STP was implemented to prevent bridge loops while concurrently ensuring all LAN or network segments remain accessible via any node in the network. STP also allows a network design to include spare (redundant) links to provide automatic backup paths if an active link fails, without the problem of bridge loops, or the need for manual enabling/disabling of these backup links. The standard implementation of STP is defined in the IEEE standard 802.1D-2004.

To visualize operation of STP, the network topology is depicted as a graph whose nodes are bridges that are coupled to LAN segments using network links having corresponding interfaces (i.e., ports) at each connection. In the context of this disclosure, rather than bridges and LAN segments, the network topology comprise compute nodes 102a-102l, SM 302, and switches 200a-200e, which comprise the switch nodes, and links 116.

The objective is similar to the purpose of the standard STP—to remove loops. At the same time, this removes any redundant routes, such that each compute node and switch node participating in the collective group may only access another compute or switch node via a single specified route. Under the embodiments herein, general principles of the standard STP are implemented, but use of the specific protocols and messages need not be implemented. Rather, similar techniques may be used. For example, Bridge Protocol Data Unit (BPDU) frames specified in IEEE standard 802.1D-2004 for Ethernet STP may be replaced by messages providing similar data.

In one embodiment, there are two types of member in the spanning tree: Local Roots and Switches. The compute nodes operate as the Local Roots, and such terms may generally be used interchangeably. Both types of members share the same basic features. First, all members of the spanning tree will have at least one child. The children of the Local Roots are the actual MPI processes executing on the compute nodes, which are not considered part of the spanning tree. The children of the switches are other switches, or Local Roots. Second, all members of the spanning tree will have a parent in the tree, except for the root of the entire tree, which will comprise a core switch. Each member will also have a collective state machine and logic for implementing a transaction ID, as described below.

The result of the spanning tree operation is shown in FIG. 3a, wherein the nodes and links in the spanning tree are shown in bold, and include Nodes D, E, F, G, H, and I, and switches 200b, 200c, and 200d. As discussed above, a spanning tree is configured such that each node may only access any other node through a single path, and there are no potential loops. The other Nodes A, B, C, J, K and L, as well as switches 200a and 200e are shown in dashed outline. These compute nodes and switches and the links connecting them still exist; however, they are not participants in either the collective group or the spanning tree for the collective group.

Figure 6A:
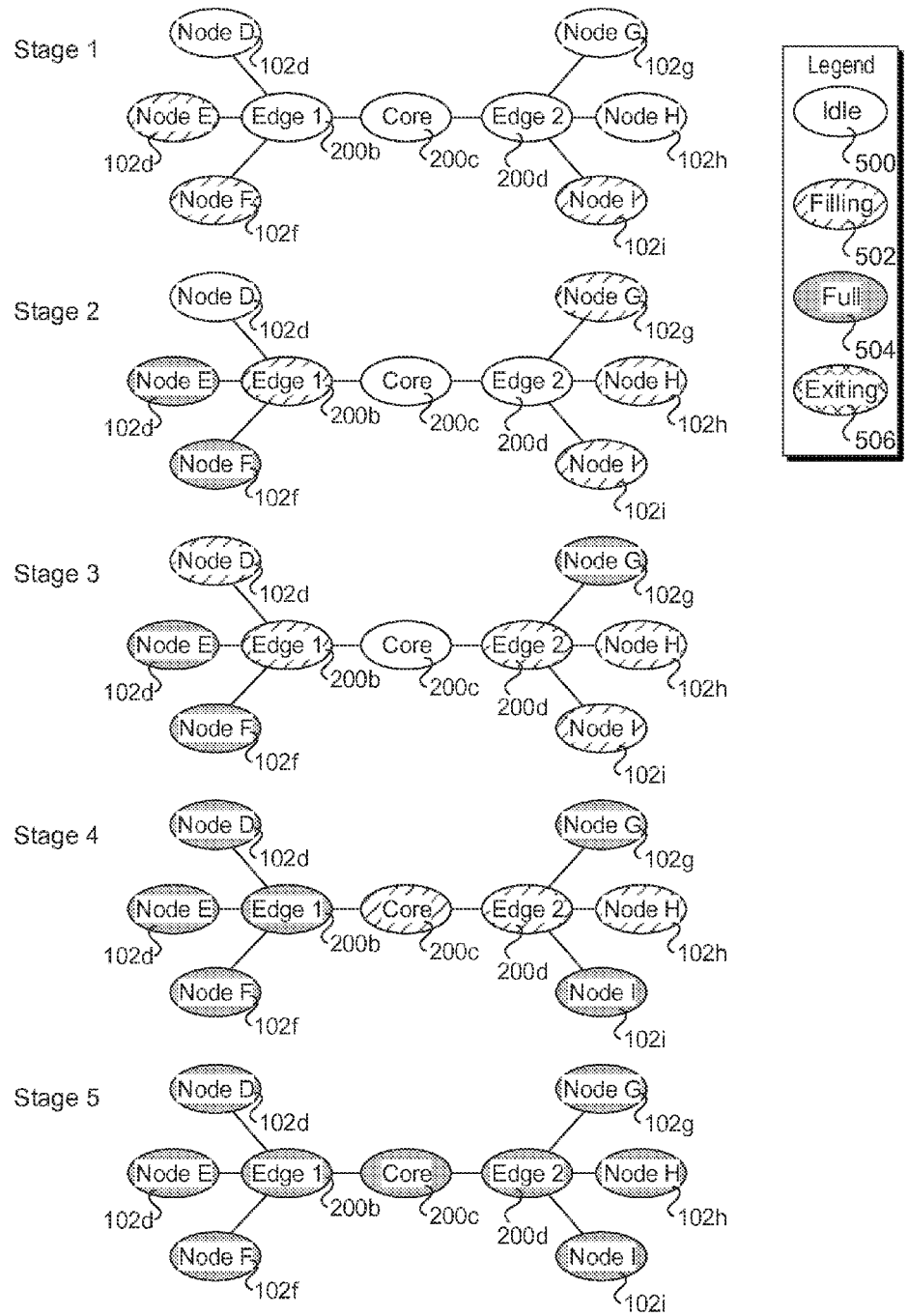
FIG. 6a is a diagram illustrating the states of nodes in the spanning tree of FIG. 3a over multiple stages implemented in connection with entering a Barrier operation.
Figure 6B:
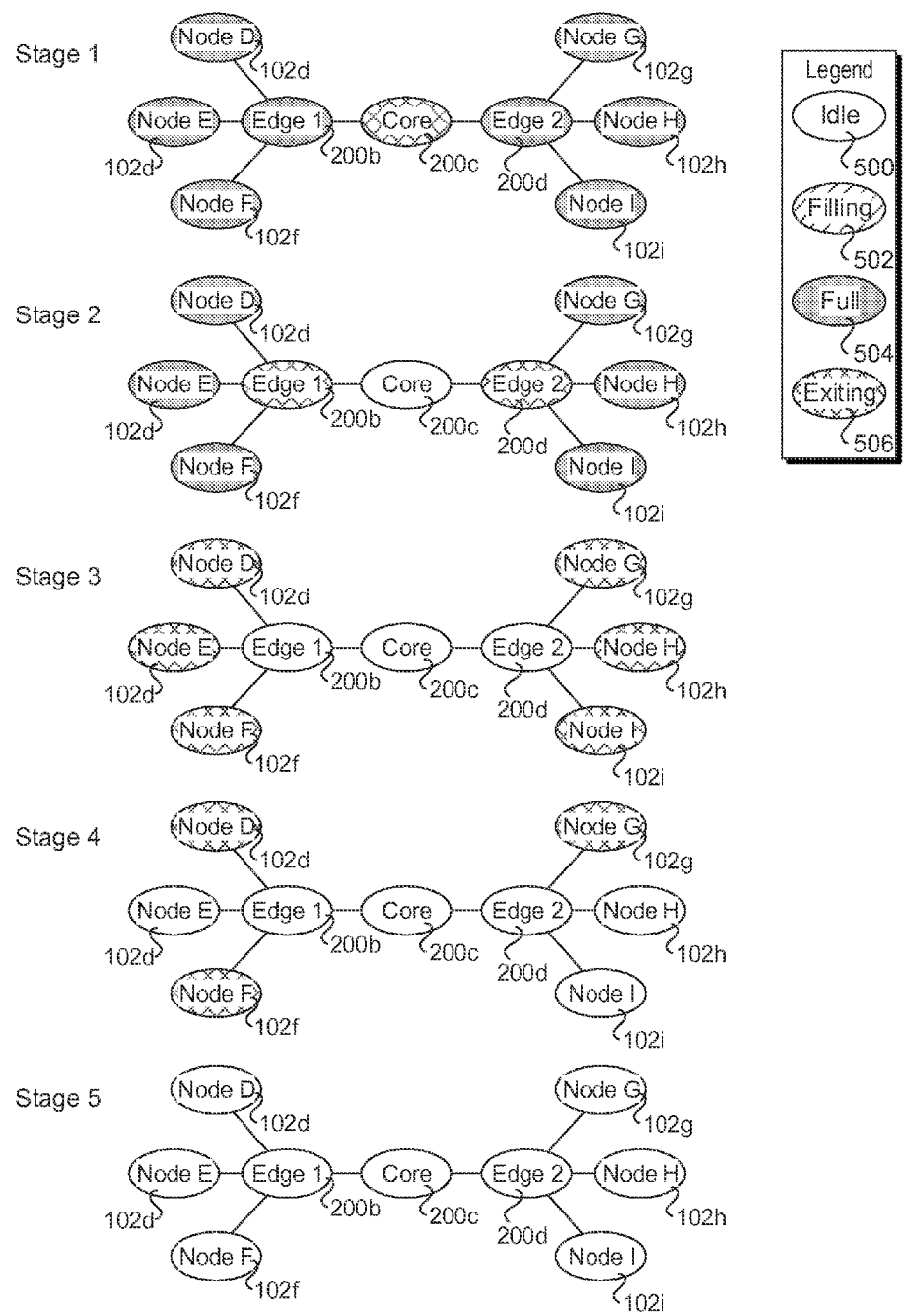
FIG. 6b is a diagram illustrating the states of nodes in the spanning tree of FIG. 3a over multiple stages when performing a release operation.

As shown in FIGS. 6a and 6b, switches 200b and 200d are edge switches that are respectively relabeled "Edge 1" and "Edge 2," while switch 200c is a core switch relabeled "Core." Generally, an edge switch will be connected to one or more compute nodes, while a core switch will not be connected to any compute nodes. For larger networks, there may be a large number of core switches, which may also be referred to as internal switches. The spanning tree paths may be selected according to various criteria, such as the shortest possible paths, least congested paths, highest bandwidth paths, or combinations thereof.

In a block 416, SM 302 notifies the switches that they are members of the collective group for processing messages regarding the collective task and which of their ports are connected to other members of the collective group. In one embodiment, the SM sends configuration information that includes a collective forwarding table describing the switch's parent node and child nodes. This enables the switches to recognize messages for the collective group. As an example, the members of the collective group may be given a unique collective group identifier (e.g., the CGID returned in block 412), which may be embedded in messages (e.g., in message headers) sent between group members to identify those messages as belonging to the collective group. In addition, the switches forwarding the messages use the collective group identifier to recognize the messages as being part of the collective group.

Each member of the Collective Group has a state machine associated with it, referred to herein as the Collective state machine or CSM. The CSM defines the behavior of that member when it receives a Collective Offload packet. In one embodiment, CSMs for compute nodes are implemented in software, while CSMs for switches are implemented in hardware. For example, state machines may be implemented in hardware via embedded logic or the like using well-known techniques. Optionally, a CSM may be implemented through software or firmware executing on an embedded processor or the like.

In one embodiment, each CSM is configured to implement the following:
- A flag indicating if the state machine is running or stopped (paused).
- A flag indicating if the state machine has failed.
- A list of switch ports that are linked to the switch's children in the Collective Group spanning tree.
- A method to indicate whether each switch port is In or Out of the current barrier.
- Which switch port is linked to the switch's parent in the spanning tree, or if the switch is the root of the spanning tree.
- A 2-bit transaction id to detect lost packets.
- The current machine state.
- The current collective offload operation (e.g., barrier)
- A configurable delay for throttling how often Ack Requests can be forwarded to the switch's parent in the spanning tree.

The operation of the state machine varies depending on the operation but, abstractly they can all be thought of as a cyclical ratcheting mechanism with 4 states: Idle, Filling, Full and Exiting and one error flag, Failure.

Figure 5:
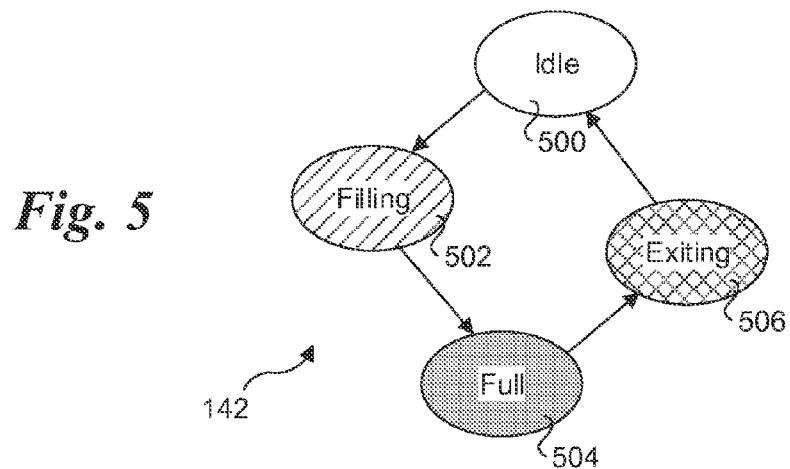
FIG. 5 is a diagram illustrating a state machine comprising a 4 state cyclical ratchet.

FIG. 5 shows an example of CSM 142 for tracking progress of collective operations, according to one embodiment. CSM 142 is executed by the computing systems participating within a collective group and the network switches used for communication among the members of the collective group. CSM 142 has a plurality of states/stages that transition in the anti-clockwise direction, like a ratchet. The first state is an Idle state 500. The next state is a Filling state 502 when a collective group member makes a valid request to begin a collective operation. CSM 142 stays at this state until all the member's children have requested the collective operation. The term "children" in this context means a switch or compute node below a member in a hierarchical structure, for example, in the spanning tree illustrated in FIGS. 6a and 6b that is described below in more detail. Thereafter, the CSM CSM 142 moves to the "Full" state 504.

If a member is a "root" member of a spanning tree and completes the collective operation, it moves to an Exit state 506. If a member is not a root member, then it sends a request to its parent, notifying the parent that the member is ready to exit. The term "parent" in this context means a switch that is higher than the member in a hierarchical structure, for example, in a spanning tree described below. The members then waits for its parent to tell it to move to the exit state. Once in the exit state, the member notifies its children that they should also move to the exit state and then moves from Exit state 306 to Idle state 300.

FIG. 6a shows an example of a spanning tree where a plurality of nodes (or computing systems) are involved to perform a collective operation. As an example, the collective operation may be a "barrier" operation. The term barrier operation means an operation where every member (or compute node) within a collective group waits until all members have reached the same state. In other words, each machine stops and waits until it is told that all systems are ready to progress. The spanning tree in FIGS. 6a and 6b are the same as depicted in FIG. 3a (with the other nodes and links removed for clarity), and discussed above.

In FIG. 6a, as the nodes enter the barrier operation, CSM 142 at each node moves from Idle state 500 to Filling state 502, and then to Full state 504. Once a node's CSM 142 reaches Full state 504, it notifies its "parent"—the switch to which it is connected. The switches' CSM 142 then transition from Idle state 500 to Filling state 502. When all the participating nodes connected to the switch indicate that they are in Full state 504 the switch also moves to Full state 304. Thereafter, the switch notifies its parent, which performs the same process. As an example, the process for starting the barrier operation is shown in 5 stages, which proceed as follows.

In stage 1, Nodes E, F, and I are in Filling state 502, while the rest of the nodes and switches are all in Idle state 500. In stage 2, Nodes E and F reach Full state 504, causing switch Edge 1 to move to Filling state 502, while Nodes G, H, and I independently reach Filling state 502. In stage 3, Node G reaches Full state 504, causing switch Edge 2 to transition to Filling state 502. Node D independently transitions to Filling state 502. The Core switch continues to be in Idle state 502 during the first three stages.

In stage 4, Node D reaches Full state 504, causing switch Edge 1 to reach Full state 504. This results in the Core switch moving to Filling state 502, while Node I independently reaches Full state 504. In stage 5, all the Nodes D, E, F, G, H, and I, switches Edge 1 and Edge 2, and the Core switch all in Full state 504. This means that every node in the Collective Group has entered the barrier operation.

FIG. 6b shows the second half of the barrier operation, called the "release," according to one embodiment. The release is also illustrated in five stages. At a high level, when the Core switch reaches Full state 504, it progresses to Exit state 506 and then notifies switches Edge 1 and Edge 2 of this transition. Switches Edge 1 and Edge 2 then forward that notification to each participating node, i.e., each of Nodes D, E, F, G, H, and I.

In stage 1, the Core switch is in Exit state 506. In stage 2, the Core switch enters Idle state 500, while switches Edge 1 and Edge 2 reach Exit state 506. In stage 3, all of the switches are in Idle state 500, while each of Nodes D, E, F, G, H, and I is in Exit state 506. In stage 4, only Nodes D, F, and G are in Exit state 506, while the rest of the Collective Group members are in Idle state 500. Thereafter, in stage 5, all the members are in the Idle state 500. Note that it is a feature of the CSM that it does not wait for children to verify that they have received a message.

Figure 7:
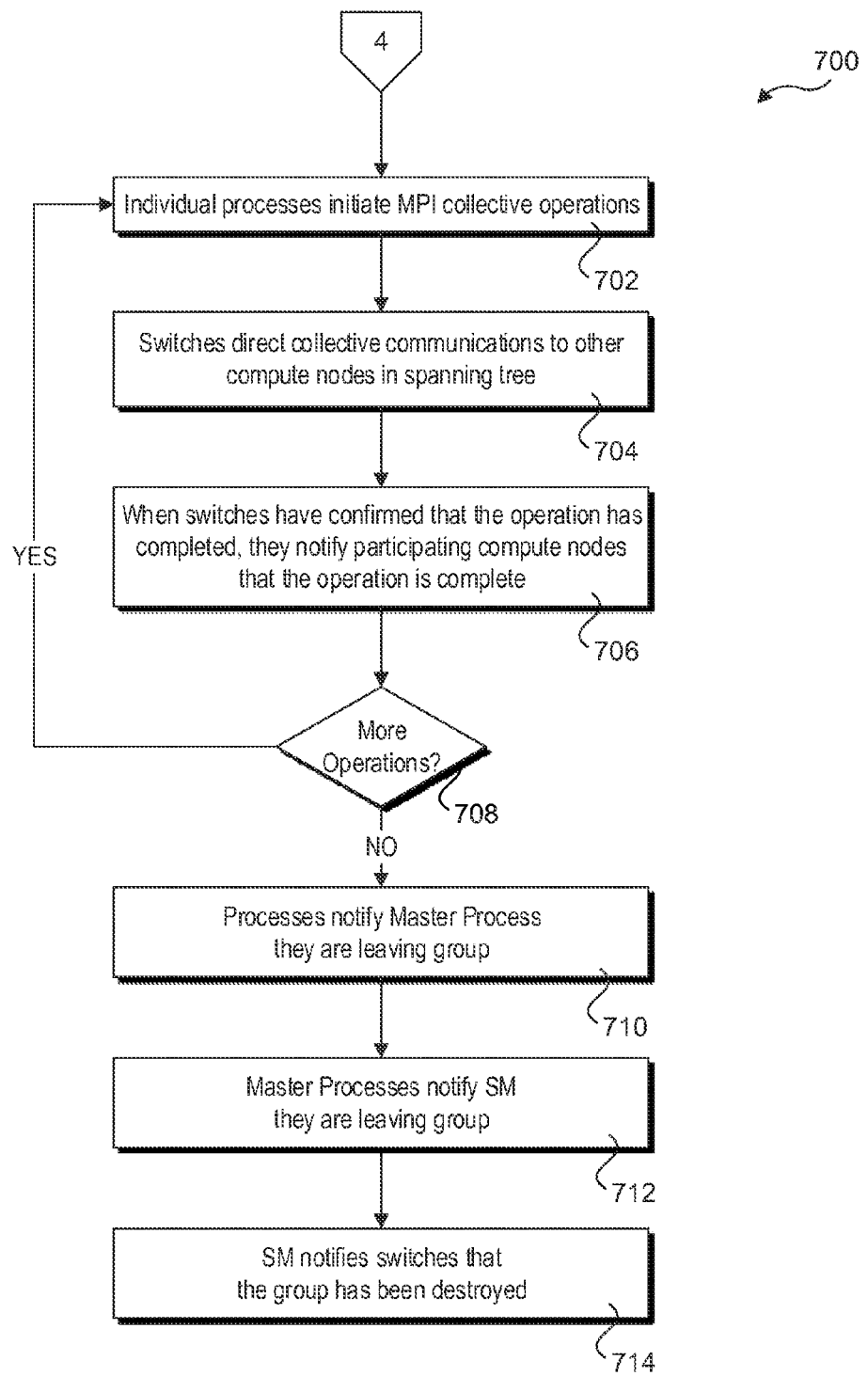
FIG. 7 is a flowchart illustrating operations performed at various nodes in the spanning tree to facilitate collective operations, according to one embodiment.

FIG. 7 shows a flowchart 700 illustrating operations performed by members of a collective group to perform one or more tasks after the setup operations of flowchart 400 have been performed. The process continues at a block 702 in which individual processes running on the compute nodes initiate MPI collective operations. As illustrated in FIG. 6a and discussed above, the switches direct collective communications to other compute nodes (and other switches, as applicable) in the spanning tree, as shown in a block 704. Next, in a block 706, when the switches have confirmed that the operation has completed, they notify the participating computer nodes that the operation is complete. Also has before, this is performed by propagating messages from a core switch through edge switches to the computer nodes.

In a decision block 708, a determination is made to whether there are any more collective operations to be done to complete the task. If YES, the flowchart logic loops back to block 702 and the operations of blocks 702, 704, and 706 are completed.

Once the collective operations have been completed, the answer to decision block 708 will be NO, and the logic will proceed to a block 710 in which the processes notify the Master Process at each compute node that they are leaving the group. The Master Processes then notify the SM that they are leaving the group, as shown in a block 712. In response in a block 714, the SM then notifies the switches that the group has been destroyed.

If the fabric was perfect, coded perfectly and the system could guarantee that no information would ever be lost, the use of collective state machines by themselves would be sufficient. However, this may not be the case. Members of the spanning tree can fall behind other members a number of ways, including lost packets, lengthy computations, packet congestion and pulled cables.

Accordingly, in order to detect out-of-order or lost messages, in one embodiment all collective offload state machines and all collective offload messages have a short, 2-bit transaction ID, or "TID". These TIDs are compared in a 2-bit modular manner necessary for error detection: A TID of 0 is "less than" a TID of 1 or 2 but is greater than a TID with a value of 3.

An Exemplary Transaction ID Comparison Table is shown below in TABLE 1.

TABLE 1

|  | B = 0 | B = 1 | B = 2 | B = 3 |
| --- | --- | --- | --- | --- |
| A = 0 | A = = B | A < B | A < B | A > B |
| A = 1 | A > B | A = = B | A < B | A < B |
| A = 2 | A > B | A > B | A = = B | A < B |
| A = 3 | A < B | A > B | A > B | A = = B |

In this model, all members of a spanning tree begin with a transaction ID of zero. When the first collective operation on that tree completes the members, beginning with the root, increment the transaction ID. In one embodiment, advancement of TIDs may be implemented via a cyclical ratcheted state machine similar to that used for the Collective state machines (e.g., a 4 TID state ratchet).

Figure 3B:
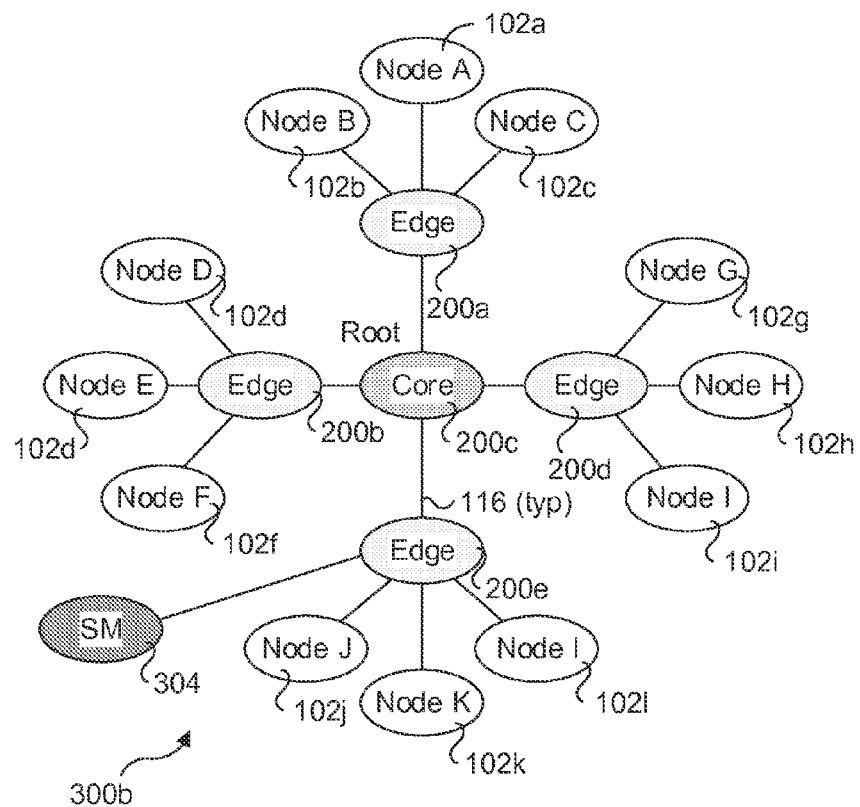
FIG. 3b shows a second spanning tree formed from nodes in the subnet of FIG. 3, including compute Nodes A, B, C, D, E, F, G, H, I, J, K, and L, and five switches.
Figure 8:
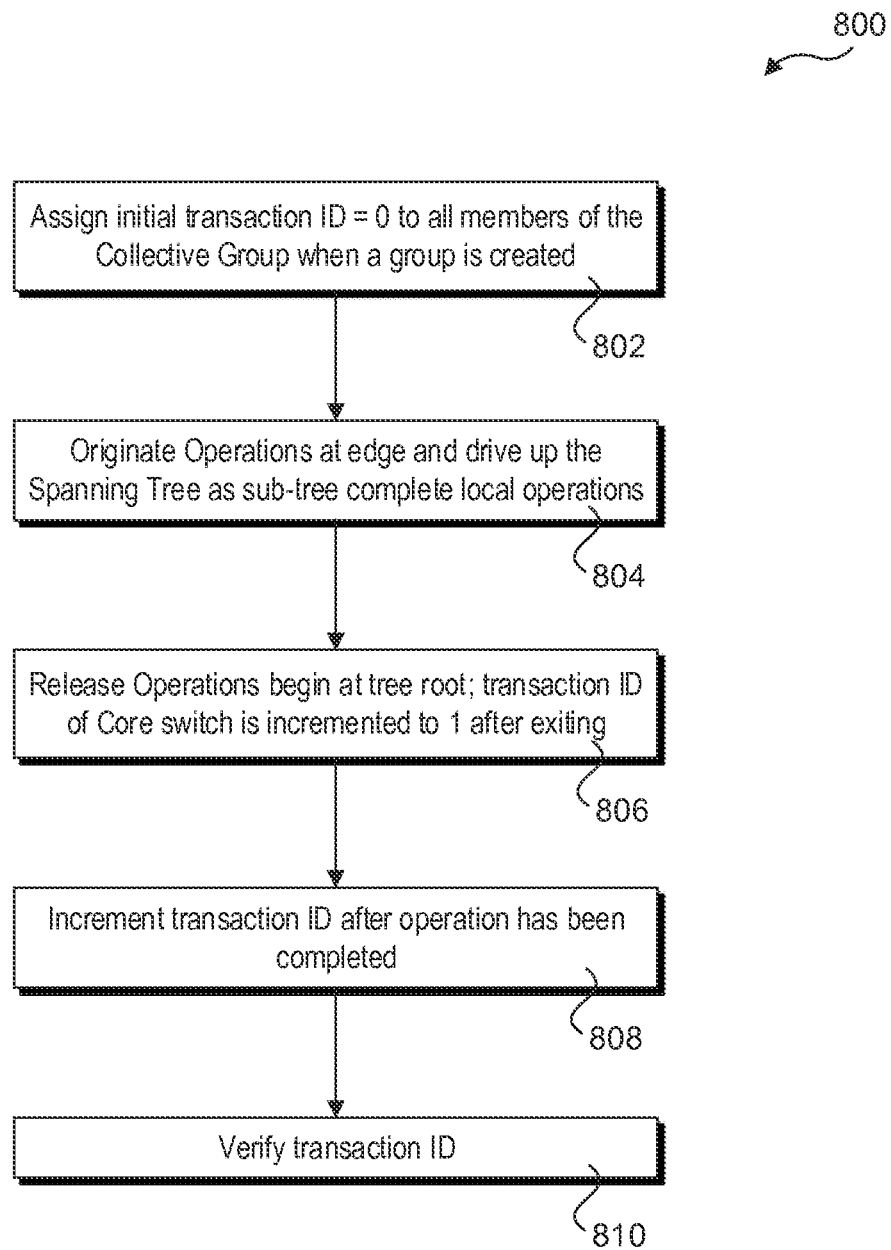
FIG. 8 is a flowchart illustrating operations for implementing transaction ID states, according to one embodiment.

An illustrative example of how a change in the transaction IDs propagates through the Collective Group is described in a flowchart 800 of FIG. 8 and the diagrams in FIGS. 9a-9g. The Collective Group members shown in the diagrams in FIGS. 9a-9g include all of the compute nodes and switches of system 300, while the corresponding spanning tree 300b is shown in FIG. 3b. The compute nodes and switches will now be referred to by their reference numbers, and include computer nodes 102a, 102b, 102c, 102d, 102e, 102f, 102g, 102h, 102i, 102j, 102k, an 102l, which are interconnected via switches edge switches 200a, 200b, 200d, and 200e, core switch 200c, and links 116. Core switch 200c also operates as the root of the spanning tree.

Figure 9A:
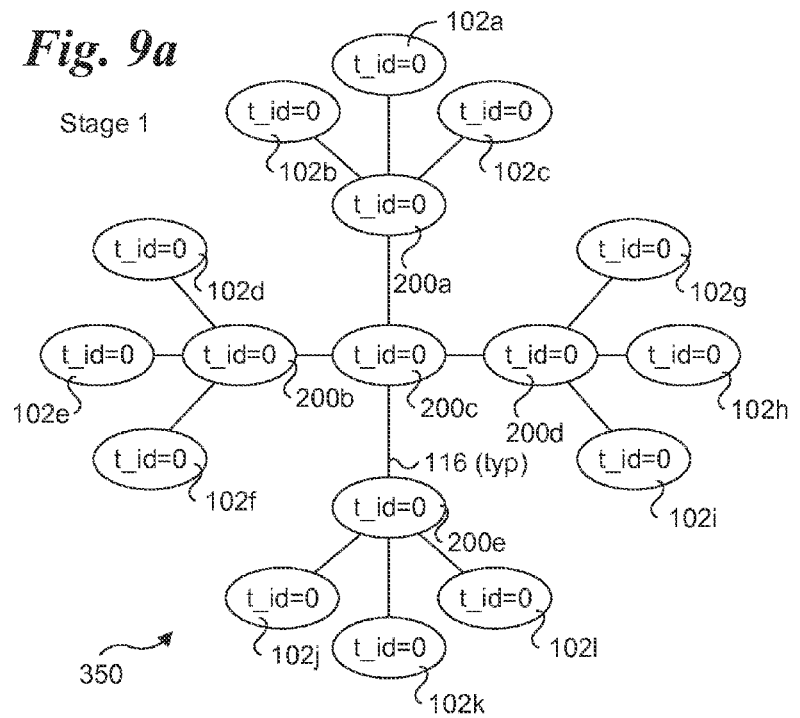
Figure 9B:
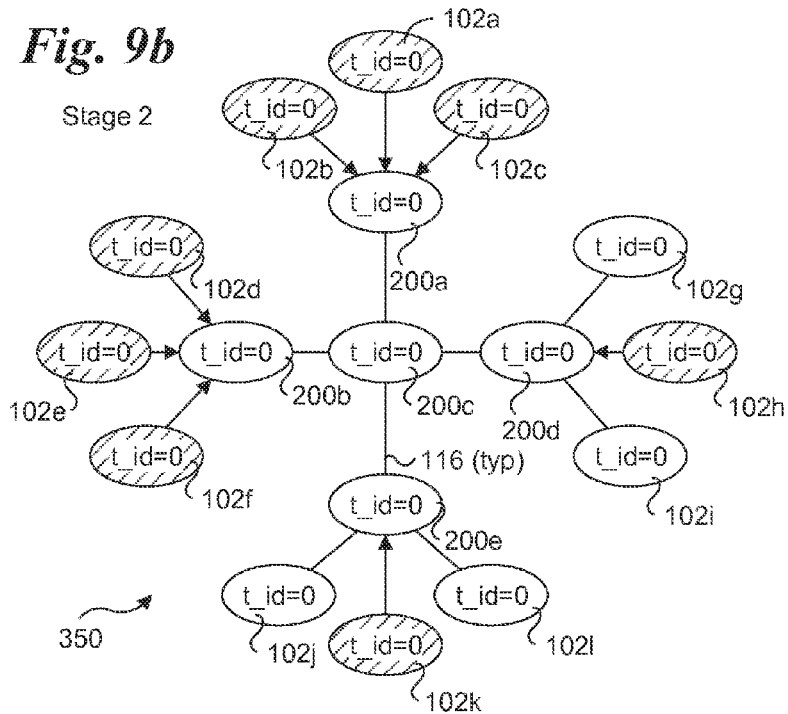

The process begins in a block 802, wherein an initial transaction ID value of 0 is assigned to each member of the Collective Group when the group is created. This is shown in stage 1 of FIG. 9a, where all the components, running CSM 142 are assigned a transaction ID (t_id) of 0 In a block 804, a collective operation, for example, the barrier operation begins. The operations begin from the edge of a spanning tree and are driven up the spanning tree as sub-trees are completed. The start of the operations is shown in stage 2 of FIG. 9b, while and stage 3 of FIG. 9c shows two sub-trees having reached Full state 504.

As shown in a block 806, the release operation begins from the root of the tree, i.e. core switch 200c. This is shown in stage 4 of FIG. 9d, with core switch 200c depicted in Exiting state 506. Once core switch 200c has completed exiting, it returns to Idle state 500 and its transaction ID is increased to 1. This is shown in FIG. 9e, stage 5, where the transaction ID of core switch 200c is increased to 1.

The transaction ID of the members is incremented as each node completes its exiting operation, as depicted in a block 808. This proceeds from core switch 200c to the edge switches, and then to the compute nodes. As shown in stage 6 of FIG. 9f, each of edge switches 200a, 200b, 200d, and 200e have completing exiting and their transaction IDs have increased to 1.

The outward propagation continues until all nodes have returned to Idle state 500 and their transaction IDs have been incremented to 1, as show in stage 7 of FIG. 9g. Thereafter, in a block 910, the transaction ID for the nodes is verified to ensure that they are have the same transaction ID. FIG. 9g depicts a stage 7 under which the transaction ID for all nodes is 1, and the state of all nodes is idle state 500.

In one embodiment, by simply reviewing the transaction ID, one is able to ascertain if a node is ahead or behind in performing a collective operation. If any errors occur due to a node being ahead or behind, the transaction IDs can be used to detect the error and then take appropriate actions.

Figure 10A:
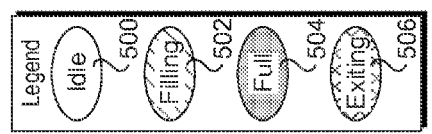
FIGS. 10a, 10b, and 10c illustrate the state machine states and transaction ID states of a sub-tree in connection with handling out-of-order operations and lost messages.
Figure 10A:
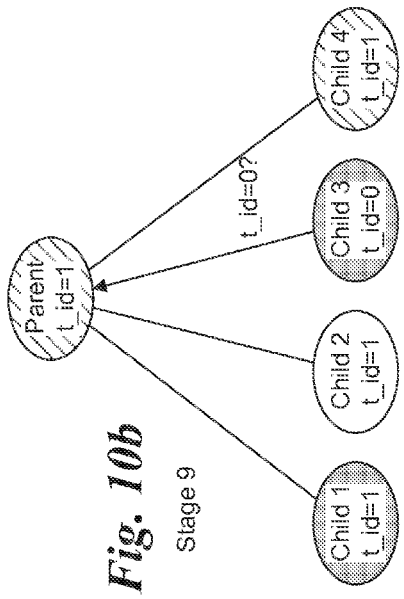
Figure 10B:
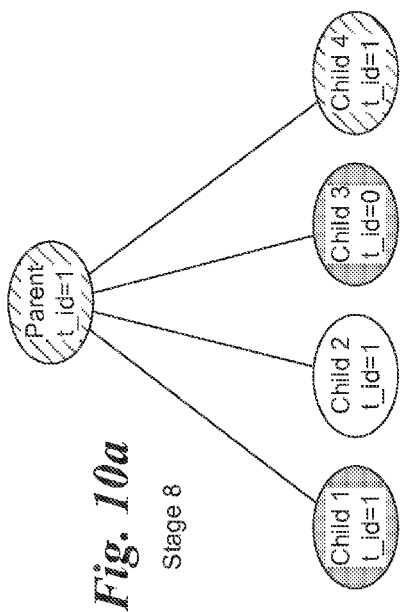
Figure 10C:
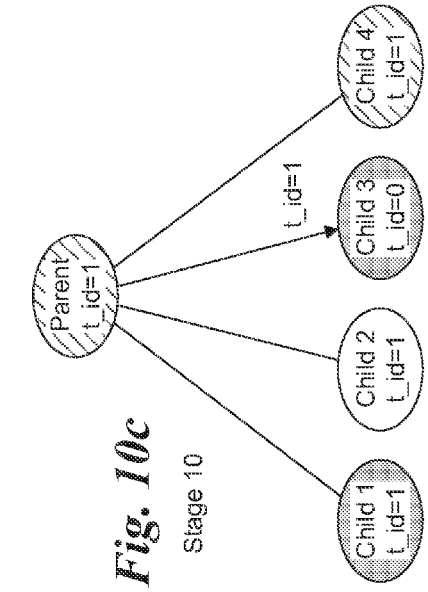

Because the Barrier Exit only flows from the top of the tree down, and the transaction ID isn't incremented until the CSM of the spanning tree root transitions from Exiting to Idle, we can assert that a member of the tree will never have a transaction ID greater than its parent's transaction ID and that a child's transaction ID will be less than its parent's transaction ID if and only if the message telling the child to exit the operation was lost. This permits errors of all sorts to be automatically recovered, even if the recovery requires the reconstruction of the entire tree with different members. For example, consider the fragment of a spanning tree illustrated in FIGS. 10a-10c.

In stage 8, we see that one of the children is still working on an old transaction. Note that because all members of the tree must participate in all collective operations, and because they must participate in the same order, transaction #1 cannot complete until the lagging child finishes transaction #0 and advances to transaction #1. Therefore, lagging children can never be more than one step behind the rest of the tree. (And, for this reason, we only need transaction IDs from 0-3, repeating in a cyclical manner. Short of a coding error, it is impossible for a child to use a transaction ID that differs from its parent by more than a value of one.)

This condition will persist until the lagging child sends a request for status, or other offload operation, to its parent, as depicted in stage 9. The parent, seeing that the child has an old transaction ID, discards the operation but then sends a response back to the child indicating that the old transaction has already completed, as depicted in stage 10. Since a lost Exit message is the only way for the child to have an older id than the parent, this will cause the child to advance its own state machine from Full to Exiting, increment its own transaction id and prepare it for the next collective operation.

The principles and techniques illustrated by way of the non-limiting embodiments disclosed herein provide substantial improvement over conventional Collective operations. As discussed above, existing MPI implementations perform Collective operations without regard to the physical arrangement of compute nodes on the network. This can lead to inefficient communication patterns where compute nodes that are physically distant from each other communicating frequently and large amounts of communication taking place over a single network link. Both these situations will slow the Collective operation. As disclosed herein, such excess communication and traffic is reduced by organizing the compute nodes and switches into a spanning tree and making the HPC applications aware of that topology of the spanning tree, thus ensuring that Collective communication will only occur between computer nodes that are physically close together on the network and ensures that members of the tree will never need to share a communications link.

Figure 11:
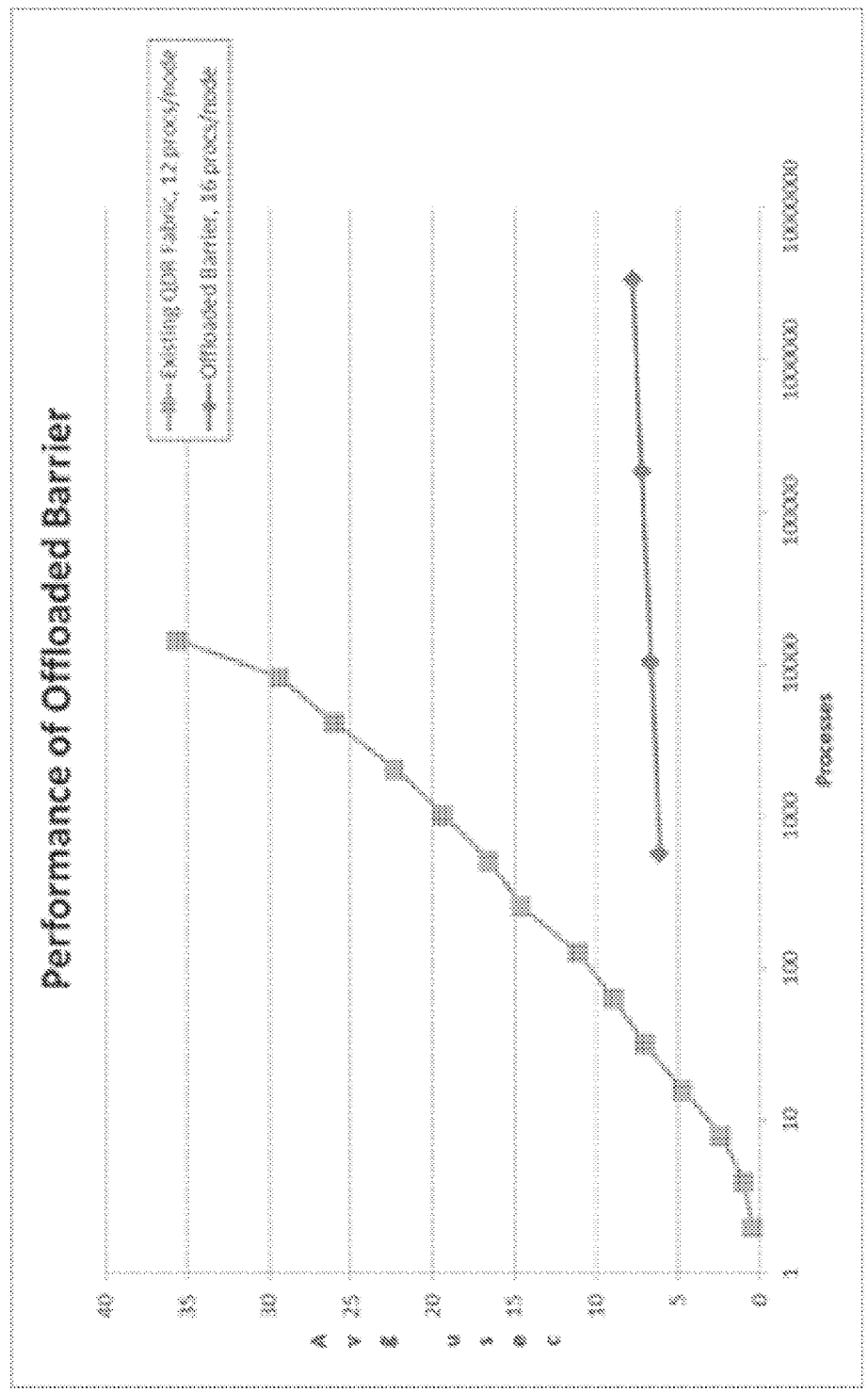
FIG. 11 is a graph illustrating a modeled performance comparison between an existing MPI implementation using an HPC cluster and an offloaded Barrier implementation using a similar HPC cluster

FIG. 11 is a graph illustrating a modeled performance comparison between an existing MPI implementation using an HPC cluster and an offloaded Barrier implementation using a similar HPC cluster. As shown, as processes are increased under the existing MPI approach, the average message latency increases at a slightly exponential rate. In contrast, increasing the number of processes under the offloaded Barrier implementation results in a very small increase in average message latency, even when the number of processes are increased by several orders of magnitude. Thus, as an HPC Collective operation increases in size (e.g., number of compute nodes and processes), the greater the benefit of using the offloaded Barrier scheme.

While the use of an exemplary Barrier Collective operation is described and illustrated herein, the teachings and principles of disclosed herein may be implemented for other types of Collective operations in a similar manner. Moreover, the same switch may be a member of multiple spanning trees. This is facilitated, in part, via the use of CGIDs in the messages transferred via the switches and exchanged between the spanning tree members.

Further aspects of the subject matter described herein are set out in the following numbered clauses:

1. A method implemented in a high performance computing (HPC) environment including a plurality of compute nodes interconnected via a plurality of switches and links, the method comprising:

identifying a set of compute nodes from among the plurality of compute nodes to participate in a collective group to perform collective operations;

configuring a spanning tree comprising a plurality of nodes including the set of compute nodes and a set of switches interconnected by a plurality of links, the set of switches including edge switches connected to compute nodes and one or more levels of core switches including a core switch at the root of the spanning tree, wherein the spanning tree is configured such that each node in the spanning tree is enabled to communicate with each of the other nodes via a single respective specified route comprising at least one link segment;

configuring each switch in the spanning tree to be aware of specified routes involving that switch and one or more message identifiers to be included in collective operation messages used to perform the collective operations; and at each switch, ntifying collective operation messages and their destinations and forwarding the collective operations messages along link segments of the specified routes connected to that switch.

2. The method of clause 1, further comprising employing the switches in the spanning tree to monitor the progress of collective operations and ensure the collective operations remain synchronized.

3. The method of clause 1 or 2, further comprising:

implementing a state machine at each node in the spanning tree;

exchanging state machine status messages between the nodes in the spanning tree; and loying the state machine status messages and state machines to synchronize collective operations performed by the collective group.

4. The method of clause 3, wherein the state machine at each node is implemented as a cyclical ratchet under which states may only advance one state at a time, the states including a first state, one or more middle states, and a last state, and wherein the state advances from the last state back to the first state.

5. The method of clause 4, wherein the state machine states includes an idle state, a filling state, a full state, and an exiting state.

6. The method of any of the proceeding clauses, further comprising:

implementing a transaction Identifying (ID) mechanism at each node in the collective group; and employing transaction IDs to detect out-of-order or lost messages.

7. The method of any of the proceeding clauses, wherein the collective operation comprises a Barrier operation.

8. The method of any of the proceeding clauses, further comprising:

initiating at least one application at each compute node in the collective group;

identifying a master process at each compute node; and notifying a subnet manager (SM) that the compute node is joining a collective group.

9. The method of any of the proceeding clauses, further comprising:

initiating collective operations via individual processes at the compute nodes participating in the collective group;

forwarding messages between processes running on the compute nodes via the switches in the spanning tree;

detecting that the collective operation has been completed; and notifying the participating compute nodes the operation has been completed.

10. A system comprising:

a plurality of compute nodes, each including a processor, at least one network port, and memory in which instructions are stored for implementing one or more processes for facilitating a collective operation;

a plurality of switches, each including a plurality of network ports, each switch linked in communication with at least one other switch via a respective link; at least a portion of the switches linked in communication with a compute node, each switch including logic for implementing a forwarding table;

a subnet manager (SM), having a processor, memory in which a subnet management application configured to be executed on the processor is stored, and a network port linked in communication with a switch;

wherein execution of the instructions in the compute nodes and the subnet management application by the SM performs operations including, sending information from compute nodes to the SM notifying the SM that the compute nodes are joining a collective group;

configuring, via the SM, a spanning tree comprising a plurality of nodes including the compute nodes in the collective group and a set of switches including edge switches connected to compute nodes and one or more levels of core switches including a core switch at the root of the spanning tree, wherein the spanning tree is configured such that each node in the spanning tree is enabled to communicate with each of the other nodes via a single respective specified route comprising at least one link segment;

configuring each switch in the spanning tree to be aware of specified routes involving that switch and one or more message identifiers to be included in collective operation messages used to perform the collective operations; and at each switch, identifying collective operation messages and their destinations and forwarding the collective operations messages along link segments of the specified routes connected to that switch.

11. The system of clause 10, wherein the switches are configured to monitor the progress of collective operations and ensure the collective operations remain synchronized.

12. The system of clause 10 or 11, wherein each node in the spanning tree is configured to:
implement a state machine;
exchange state machine status messages with adjacent nodes; and
wherein the nodes are configured to collectively employ the state machine status messages and state machines to synchronize collective operations performed by the collective group.

13. The system of clause 12, wherein the state machine at each node is implemented as a cyclical ratchet under which states may only advance one state at a time, the states including a first state, one or more middle states, and a last state, and wherein the state advances from the last state back to the first state.

14. The system of clause 13, wherein the state machine states includes an idle state, a filling state, a full state, and an exiting state.

15. The system of any of clauses 10-14, wherein each node in the spanning tree is configured to implement a transaction Identifying (ID) mechanism, and wherein the nodes collectively are configured to employ transaction IDs to detect out-of-order or lost messages.

16. The system of any of clauses 10-15, wherein each compute node in the spanning tree is configured to:
initiate an application including one or more processes;
identify a master process; and
notify the (SM) that the compute node is joining a collective group.

17. The system of any of clauses 10-16, wherein the compute nodes in the spanning tree are configured to initiate collective operations via individual processes executing on the compute nodes and send messages to processes running on other computer nodes, and wherein the switches are configured to:
forward messages between processes executing on the compute nodes;
detect that the collective operation has been completed; and
notify the participating compute nodes the collective operation has been completed.

18. An apparatus configured to be implemented as a subnet manager in a network environment including a plurality of compute nodes interconnected via a plurality of switches and links, the apparatus comprising:
a processor;
a network adapter, operatively coupled to the processor having at least one port; and
memory in which instructions comprising a management application are stored, wherein the instructions are configured to be executed on the processor to enable the apparatus, when the apparatus is linked in communication with a switch in the network environment, to,
receive notifications from compute nodes indicating they are joining a collective group;
determine a spanning tree to be used for the collective group comprising a plurality of nodes including the compute nodes providing notifications indicating they are joining the collective group and a set of switches including edge switches connected to the compute nodes and one or more levels of core switches including a core switch at the root of the spanning tree, wherein the spanning tree is configured such that each node in the spanning tree is enabled to communicate with each of the other nodes via a single respective specified route comprising at least one link segment; and
provide configuration information to each of the switches in the spanning tree for implementing message forwarding operations for the portion of the spanning tree that includes links coupled to that switch.

19. The apparatus of clause 18, wherein execution of the instructions further enable the apparatus to:
receive network topology information from at least a portion of the compute nodes and switches in the network environment; and
determine a network topology of at least a portion of the network environment including all of the nodes in the spanning tree.

20. The apparatus of clause 18 or 19, wherein each node in a spanning tree other than the node that is the root of the spanning includes a parent node and at least one child node, and the configuration information provided to each switch includes a collective forwarding table describing the switch's parent node and child nodes.

21. The apparatus of any of clauses 18-20, wherein execution of the instructions further enables the apparatus to:
receive notification from compute nodes that they are leaving a collective group; and
notify switches in the spanning tree that the collective group has been destroyed.

22. A switch apparatus configured to be implemented as a switch in a network environment including a plurality of compute nodes interconnected via a plurality of switches and links, the switch apparatus comprising:
a plurality of ports;
a processor; and
memory, operatively coupled to the processor; and
embedded logic configured to implement a state machine;
wherein the switch apparatus is configured to be implemented as a switch node in a spanning tree including a plurality of compute nodes that are members of a collective group and running processes to implement collective operations, and wherein the switch apparatus is further configured to,
receive configuration information including a collective forwarding table describing the switch's parent node and child nodes in the spanning tree;
forward messages originating from sending compute nodes and destined for destination compute nodes in accordance with the collective forwarding table; and
exchange messages with adjacent nodes to ensure synchronization of the collective operations.

23. The switch apparatus of clause 22, further comprising embedded logic for implementing a ratcheted cyclical state machine, and wherein the switch apparatus is further configured to:
update it's state machine state in response to applicable events; and exchange state machine status messages with adjacent nodes in the spanning tree.

24. The switch apparatus of clause 22 or 23, wherein the switch apparatus is configured to be implemented as an edge switch in the spanning tree under which a plurality of the ports are linked to respective compute nodes.

25. The switch apparatus of any of clauses 22-24, wherein the switch apparatus is configured to be implemented as a core switch comprising the root of the spanning tree.

26. A non-transitory tangible machine-readable medium having instructions comprising a management application configured to be executed on an apparatus configured to be implemented as a subnet manager in a network environment including a plurality of compute nodes interconnected via a plurality of switches and links, wherein execution of the instructions enables the apparatus to:

receive notifications from compute nodes indicating they are joining a collective group;

determine a spanning tree to be used for the collective group comprising a plurality of nodes including the compute nodes providing notifications indicating they are joining the collective group and a set of switches including edge switches connected to the compute nodes and one or more levels of core switches including a core switch at the root of the spanning tree, wherein the spanning tree is configured such that each node in the spanning tree is enabled to communicate with each of the other nodes via a single respective specified route comprising at least one link segment; and provide configuration information to each of the switches in the spanning tree for implementing message forwarding operations for the portion of the spanning tree that includes links coupled to that switch.

27. The non-transitory tangible machine-readable medium of clause 26, wherein execution of the instructions further enable the apparatus to:

receive network topology information from at least a portion of the compute nodes and switches in the network environment; and determine a network topology of at least a portion of the network environment including all of the nodes in the spanning tree.

28. The non-transitory tangible machine-readable medium of clause 26 or 27, wherein each node in a spanning tree other than the node that is the root of the spanning includes a parent node and at least one child node, and the configuration information provided to each switch includes a collective forwarding table describing the switch's parent node and child nodes.

29. The non-transitory tangible machine-readable medium of any of clauses 26-28, wherein execution of the instructions further enables the apparatus to:

receive notification from compute nodes that they are leaving a collective group; and notify switches in the spanning tree that the collective group has been destroyed.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As discussed above, various aspects of the embodiments herein may be facilitated by corresponding software and/or firmware components and applications, such as software running on a compute node or device processor or software and/or firmware executed by an embedded processor or the like, such as might be used on a switch. Thus, embodiments of this invention may be used as or to support a software program, software modules, firmware, and/or distributed software executed upon some form of processing core (such as the CPU of a computer, one or more cores of a multi-core processor), a virtual machine running on a processor or core or otherwise implemented or realized upon or within a computer-readable or machine-readable non-transitory storage medium. A computer-readable or machine-readable non-transitory storage medium includes any mechanism for storing or transmitting information in a form readable by a machine (e.g., a computer). For example, a computer-readable or machine-readable non-transitory storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer-readable or machine-readable non-transitory storage medium may also include a storage or database from which content can be downloaded. The computer-readable or machine-readable non-transitory storage medium may also include a device or product having content stored thereon at a time of sale or delivery. Thus, delivering a device with stored content, or offering content for download over a communication medium may be understood as providing an article of manufacture comprising a computer-readable or machine-readable non-transitory storage medium with such content described herein.

Various components referred to above as blocks, processes, or agent, described herein may be a means for performing the functions described. The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including computer-readable or machine-readable non-transitory storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A non-transitory computer readable medium having instructions stored thereon configured to be executed by a processor of a subnet manager in a network environment including a plurality of compute nodes interconnected via a plurality of switches and links, wherein execution of the instructions enables the subnet manager, when the subnet manager is linked in communication with a switch in the network environment, to:
    receive notifications from compute nodes indicating they are joining a collective group;
    determine a spanning tree to be used for the collective group comprising a plurality of nodes including the compute nodes providing notifications indicating they are joining the collective group and a set of switches including edge switches connected to the compute nodes and one or more levels of core switches including a core switch at the root of the spanning tree, wherein the spanning tree is configured such that each node in the spanning tree is enabled to communicate with each of the other nodes via a single respective specified route comprising at least one link segment; and
    provide configuration information to each of the switches in the spanning tree for implementing message forwarding operations for the portion of the spanning tree that includes links coupled to that switch.

2. The non-transitory computer readable medium of claim 1, wherein execution of the instructions further enable the subnet manager to:
    receive network topology information from at least a portion of the compute nodes and switches in the network environment; and
    determine a network topology of at least a portion of the network environment including all of the nodes in the spanning tree.

3. The non-transitory computer readable of claim 1, wherein each node in a spanning tree other than the node that is the root of the spanning includes a parent node and at least one child node, and the configuration information provided to each switch includes a collective forwarding table describing the switch's parent node and child nodes.

4. The non-transitory computer readable of claim 1, wherein execution of the instructions further enables the subnet manager to:
    receive notification from compute nodes that they are leaving a collective group; and
    notify switches in the spanning tree that the collective group has been destroyed.

5. The non-transitory computer readable of claim 1, wherein execution of the instructions further enables the subnet manager to:
    receive, for each of a plurality of compute nodes, a notification that the compute node is joining a collective group; and
    return a collective group identifier (CGID) to each of the plurality of compute nodes.

6. The non-transitory computer readable of claim 5, wherein operations in the network environment are implemented using distributed Message Passing Interface (MPI) processes including a local master process on each of the plurality of compute nodes, and wherein the notification that the compute node is joining a collective group is received from the local master process of the compute node and the CGID is returned to the local master process of the compute node.

7. The non-transitory computer readable of claim 6, wherein the notification that the compute node is joining a collective group includes registration information identifying MPI processes that are operating on the compute node.

8. At least one non-transitory computer readable medium, having instructions stored thereon comprising a distributed Message Passing Interface (MPI) application including a plurality of MPI processes and a subnet management application configured to facilitate a collective operation in a network environment including a plurality of compute nodes and a subnet manager (SM) interconnected via a plurality of switches and links, wherein distributed execution of instructions corresponding to the MPI processes on the compute nodes and the subnet management application on the SM performs operations including:
    sending information from compute nodes to the SM notifying the SM that the compute nodes are joining a collective group;
    configuring, via the SM, a spanning tree comprising a plurality of nodes including the compute nodes in the collective group and a set of switches including edge switches connected to compute nodes and one or more levels of core switches including a core switch at the root of the spanning tree, wherein the spanning tree is configured such that each node in the spanning tree is enabled to communicate with each of the other nodes via a single respective specified route comprising at least one link segment;
    configuring each switch in the spanning tree to be aware of specified routes involving that switch and one or more message identifiers to be included in collective operation messages used to perform the collective operations; and
    at each switch,
    identifying collective operation messages and their destinations and forwarding the collective operations messages along link segments of the specified routes connected to that switch.

9. The at least one non-transitory computer readable medium of claim 8, wherein distributed execution of the instructions enable each node in the spanning tree to:

implement a state machine;
exchange state machine status messages with adjacent nodes; and
wherein the nodes are configured to collectively employ the state machine status messages and state machines to synchronize collective operations performed by the collective group.

10. The at least one non-transitory computer readable medium of claim 9, wherein the state machine at each node is implemented as a cyclical ratchet under which states may only advance one state at a time, the states including a first state, one or more middle states, and a last state, and wherein the state advances from the last state back to the first state.

11. The at least one non-transitory computer readable medium of claim 10, wherein the state machine states includes an idle state, a filling state, a full state, and an exiting state.

12. The at least one non-transitory computer readable medium of claim 8, wherein distributed execution of the instructions enable each node in the spanning tree to implement a transaction Identifying (ID) mechanism, and wherein the nodes collectively are enabled to employ transaction IDs to detect out-of-order or lost messages.

13. The at least one non-transitory computer readable medium of claim 8, wherein distributed execution of the instructions enable each compute node in the spanning tree is to:
initiate an application including one or more MPI processes;
identify a master process; and
notify the SM that the compute node is joining a collective group.

14. The at least one non-transitory computer readable medium of claim 8, wherein distributed execution of the instructions further performs operations including:
assigning an initial transaction ID =0 to all members of the collective group;
originating operations at the edge of the spanning tree and driving up the spanning tree as sub-trees within the spanning tree complete local operations.

15. The at least one non-transitory computer readable medium of claim 14, wherein distributed execution of the instructions further performs operations including:
releasing operations beginning at a root of the spanning tree after the operations performed by the MPI processes on a given node in the spanning tree have been completed.

16. The at least one non-transitory computer readable medium of claim 15, wherein distributed execution of the instructions further performs operations including:
incrementing a transaction ID at a given node after the operation performed by the MPI processes on the given node has been completed.

17. The at least one non-transitory computer readable medium of claim 8, wherein distributed execution of the instructions performs operations including:
launching MPI application processes on a plurality of the compute nodes;
recognizing, via an MPI process executing on a given node, that the MPI process is part of a set or subset of processes that make up the MPI application and the MPI process registering with is local master process it membership in the set or subset of processes that make up the MPI application.

18. The at least one non-transitory computer readable medium of claim 8, wherein the collective operation comprises a Barrier operation.

* * * * *